US008693766B2

(12) United States Patent
Kameyama et al.

(10) Patent No.: US 8,693,766 B2
(45) Date of Patent: Apr. 8, 2014

(54) RAPID DISCRIMINATION APPARATUS, METHOD OF SPEEDING UP THE SAME, AND PROGRAM OF THE SAME

(75) Inventors: Hirokazu Kameyama, Kanagawa-ken (JP); Yi Hu, Kanagawa-ken (JP); Tetsuya Takamori, Kanagawa-ken (JP); Ryota Izumi, Fukuoka (JP); Masanori Kawakita, Fukuoka (JP); Jun-ichi Takeuchi, Fukuoka (JP)

(73) Assignee: FUJIFILM Corporation, Tokyo (JP)

( * ) Notice: Subject to any disclaimer, the term of this patent is extended or adjusted under 35 U.S.C. 154(b) by 83 days.

(21) Appl. No.: 13/552,389

(22) Filed: Jul. 18, 2012

(65) Prior Publication Data

US 2013/0022249 A1 Jan. 24, 2013

(30) Foreign Application Priority Data

Jul. 19, 2011 (JP) .................................. 2011-157653
Jul. 28, 2011 (JP) .................................. 2011-165173

(51) Int. Cl.
*G06K 9/62* (2006.01)
*G06K 9/00* (2006.01)

(52) U.S. Cl.
USPC ............ 382/159; 382/103; 382/128; 382/224

(58) Field of Classification Search
USPC .................... 382/103, 128, 159, 224
See application file for complete search history.

(56) References Cited

U.S. PATENT DOCUMENTS

2004/0234136 A1* 11/2004 Zhu et al. ...................... 382/224
2008/0077543 A1* 3/2008 Kobayashi et al. ............. 706/12

OTHER PUBLICATIONS

Y. Freund and R. E. Schapire, "A Decision-Theoretic Generalization of On-Line Learning and an Application to Boosting", Journal of Computer and System Sciences, vol. 55, pp. 119-139, 1997.

* cited by examiner

*Primary Examiner* — Amir Alavi
*Assistant Examiner* — Kenny Cese
(74) *Attorney, Agent, or Firm* — Birch, Stewart, Kolasch, & Birch, LLP

(57) ABSTRACT

When obtaining a final result from a discriminator group arranged in a predetermined order, an evaluation value obtaining unit successively evaluates each discriminator from a first discriminator and if it is determined that a discrimination result represented by an overall evaluation value obtained by evaluating the first to $I^{th}$ discriminators remains unchanged even if evaluation values of $I+1^{th}$ and subsequent discriminators are added to the overall evaluation value, a discrimination result determination unit instructs the evaluation value obtaining unit to terminate the evaluation of the $I+1^{th}$ and subsequent discriminators, and determines the discrimination result according to the overall evaluation value obtained by evaluating the first to $I^{th}$ discriminators as a final result.

22 Claims, 14 Drawing Sheets

RAPID DISCRIMINATION APPARATUS, METHOD OF SPEEDING UP THE SAME, AND PROGRAM OF THE SAME

BACKGROUND OF THE INVENTION

1. Field of the Invention

The present invention relates to discrimination of an object included in image data and more particularly to improvement in the speed of discrimination that uses a plurality of discriminators.

2. Description of the Related Art

Boosting is an algorithm for building an accurate discriminator by combining a plurality of discriminators which are not necessarily accurate. Discriminators learned through the boosting are used in various sectors of industry as described, for example, in Y. Freund and R. E. Schapire, "A Decision-Theoretic Generalization of On-Line Learning and an Application to Boosting", Journal of Computer and System Sciences, vol. 55, pp. 119-139, 1997.

In particular, discriminators are used in face detection, face recognition, and the like, and have become familiar in our life due to wide spread use of digital cameras and video cameras. The face detector is a discriminator that receives a luminance value of a certain image area, as input data, and discriminates whether or not a face is present in the image area. The research of face detection has been conducted from the latter half of 1990s, but a practical method was not developed due to calculation speed. But real time face detection has become possible by a face detector proposed by Viola and Jones. The detector employs a weak classifier that uses a Haar-Like feature (FIG. 20) that allows rapid calculation.

The reason why boosting is used for face detection is that more importance is placed on the discrimination time of actual discrimination than on the time required for learning a discrimination apparatus. One of the reasons why the boosting allows rapid discrimination in the face detection problem is the employment of the feature that allows rapid calculation described above. In addition, the use of a method in which evaluation of weak classifiers is terminated halfway is another point of rapid face detection. The discrimination apparatus which can be obtained by boosting is a liner connection of weak classifiers, and a method in which these classifies are evaluated successively to obtain a final discrimination result is generally used.

Generally, a probability that a face is present in an image is low and many weak classifiers classify as "not a face". For a discrimination apparatus which includes many weak classifiers that classify as "not a face", termination of the evaluation halfway may reduce the average time required for the discrimination. In particular, if a weak classifier having a high contribution to classification of "not a face" is evaluated first, the evaluation can be terminated in an earlier stage. That is, the order of arrangement of the weak classifiers is an important factor for rapid discrimination.

Heretofore, the arrangement order of a group of weak classifiers provided by the boosting or the like is designed based on the assumption that all weak classifiers are used. Thus, discrimination only by some of the weak classifiers instead of using all the classifiers will result in sacrifice of accuracy, and it has been difficult to enhance the overall performance in which the discrimination speed and accuracy are balanced.

In view of the circumstances described above, it is an object of the present invention to provide a rapid discrimination apparatus, which includes a plurality of weak classifiers, capable of performing rapid discrimination without sacrificing discrimination accuracy, a method for speeding up the rapid discrimination apparatus, and a program of the rapid discrimination apparatus.

SUMMARY OF THE INVENTION

A rapid discrimination apparatus of the present invention is an apparatus for obtaining a result of discrimination as to whether or not a predetermined object is included in target data of discrimination, the apparatus including:

a target data input accepting unit that accepts input of the target data "x";

a discriminator group constituted by a plurality of discriminators $f_j$ (j=1 to J) arranged in a predetermined order and used for evaluating whether or not the object is included in the target data "x";

an evaluation value obtaining unit that obtains an evaluation value $f_j(x)$ of the target data "x" evaluated using each of the plurality of discriminators successively from a first discriminator and sequentially obtains an overall evaluation value $F_i(x)$ derived from evaluation values $f_j(x)$ (j=1 to i) of first to $i^{th}$ discriminators from i=1 to J; and a discrimination result determination unit that instructs the evaluation value obtaining unit to terminate the evaluation of $I+1^{th}$ and subsequent discriminators if it is determined, based on a range of evaluation values that each of the $I+1^{th}$ and subsequent discriminators can possibly take, that a discrimination result represented by an overall evaluation value $F_J(x)$ obtained by evaluating the first to $i=I^{th}$ discriminators (I<J) by the evaluation value obtaining unit remains unchanged even if evaluation values of the $I+1^{th}$ and subsequent discriminators are added to the overall evaluation value $F_I(x)$ obtained by evaluating the first to $I^{th}$ discriminators, and determines the discrimination result according to the overall evaluation value $F_I(x)$ obtained by evaluating the first to $I^{th}$ discriminators as a final result.

A program of the present invention is a program of rapid discrimination apparatus for obtaining a result of discrimination as to whether or not a predetermined object is included in target data of discrimination, the program causing a computer to function as:

a target data input accepting unit that accepts input of the target data "x";

a discriminator group constituted by a plurality of discriminators $f_j$ (j=1 to J) arranged in a predetermined order and used for evaluating whether or not the object is included in the target data "x";

an evaluation value obtaining unit that obtains an evaluation value $f_j(x)$ of the target data "x" evaluated using each of the plurality of discriminators successively from a first discriminator and sequentially obtains an overall evaluation value $F_i(x)$ derived from evaluation values $f_j(x)$ (j=1 to i) of first to $i^{th}$ discriminators from i=1 to J; and a discrimination result determination unit that instructs the evaluation value obtaining unit to terminate the evaluation of $I+1^{th}$ and subsequent discriminators if it is determined, based on a range of evaluation values that each of the $I+1^{th}$ and subsequent discriminators can possibly take, that a discrimination result represented by an overall evaluation value $F_J(x)$ obtained by evaluating the first to $i=I^{th}$ discriminators (I<J) by the evaluation value obtaining unit remains unchanged even if evaluation values of the $I+1^{th}$ and subsequent discriminators are added to the overall evaluation value $F_I(x)$ obtained by evaluating the first to $I^{th}$ discriminators, and determines the discrimination result according to the overall evaluation value $F_I(x)$ obtained by evaluating the first to $I^{th}$ discriminators as a final result.

The term "target data" as used herein refers to image data, sound data, character data, biometric data, and natural/physical data. The image data may include images obtained by imaging devices such as digital still cameras, and the like, and images obtained by medical imaging systems such as CT, MRI, and the like. The biometric data may be measurement data of heartbeat, pulsation, blood pressure, respiration, waveform, period and amplitude of perspiration, and the like. The natural/physical data may be measurement data of weather, climate, waveform, period and amplitude of earthquake, and the like. The character data refer to data of characters (including numerals).

The term "object" as used herein refers to an object included in target data, and it may be, for example, a certain region of appearance of a human body, such as a face, head, or hand included in an image of target data obtained by an imaging device, such as a digital still camera or the like, or an area that includes at least a certain region within a living body instead of the appearance of a human body. The term "living body" as used herein refers to a specific tissue in a living body, such as a blood vessel. In the case where the target data represent an image obtained by an endoscope system, microscope, or the like, the object may be a tumor tissue, cell, protein, macromolecule, such as DNA or RNA, and low molecule in a living body. Further, the object may be a compound, such as a medicine or the like, protein, and the like imaged by a microscope other than a living body. Still further, the object may be an image of currency, card, such as a cash card, automobile, or car registration plate represented by target data obtained by an imaging device, such as a digital still camera or the like. In the case where the target data represent an image obtained by a scanning device, such as a copy machine, the object may be a character, drawing, table, or photograph of a document. Further, the object may be a statistically biased group when image data are statistically analyzed and, for example, it may be a texture. In the case where the target data are sound data, the object may be, for example, a voice, sound of living body, voice of creature (animal, bird, and insect), sound of musical instrument, sound of vehicle, and the like.

The discriminator group may be a group that stores, as well as the plurality of discriminators $f_j$, a weight $\alpha_j$ of each discriminator; and the evaluation value obtaining unit may be a unit that sequentially obtains an overall evaluation value $F_i(x)$ given blow which is a linear combination of an evaluation value $f_j(x)$ of each of the first to $i^{th}$ discriminators and the weight $\alpha_j$ of each discriminator from i=1 to J.

$$F_i(x) = \sum_{j=1}^{i} \alpha_j f_j(x)$$

where $f_j(x) = \begin{cases} 1 & \text{if } x \in A_j \quad A_j: \text{"True" area} \\ -1 & \text{otherwise} \end{cases}$ Preferably, the discrimination result determination unit may be a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 1 given below and determines the discrimination result according to the overall evaluation value $F_I(x)$ obtained by evaluating the first to I$^{th}$ discriminators as a final result.

$$F_I(x) = \left| \sum_{j=1}^{I} \alpha_j f_j(x) \right| > \sum_{j=I+1}^{J} \alpha_j \qquad \text{Condition 1}$$

Further, the discrimination result determination unit may be a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 2 given below and determines the discrimination result according to the overall evaluation value $F_I(x)$ obtained by evaluating the first to I$^{th}$ discriminators as a final result.

$$F_I(x) = \left| \sum_{j=1}^{I} \alpha_j f_j(x) \right| > b \times \sum_{j=I+1}^{J} \alpha_j \qquad \text{Condition 2}$$

where $0.0 < b < 1.0$

Still further, the evaluation value obtaining unit may be a unit that sequentially obtains an overall evaluation value $F_i(x)$ given blow which is a linear combination of the evaluation values $f_j(x)$ of first to $i^{th}$ discriminators.

$$F_i(x) = \left( \sum_{j=1}^{i} f_j(x) \right) - T$$

where $f_j(x) = \begin{cases} \alpha_j & \text{if } x \in A, \quad A_j: \text{"True" area} \\ \beta_j & \text{otherwise} \end{cases}$ $T$: threshold value $\alpha_j, \beta_j$: real numbers Preferably, the discrimination result determination unit is a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 3-1 or 4-1 given below and determines the discrimination result according to the overall evaluation value $F_I(x)$ obtained by evaluating the first to I$^{th}$ discriminators as a final result.

$$F_I(x) + m_I^- \geq 0 \qquad \text{Condition 3-1}$$

$$F_I(x) + m_I^+ \leq 0 \qquad \text{Condition 4-1}$$

where $F_I(x) = \left( \sum_{j=1}^{I} f_j(x) \right) - T$ $$m_I^+ := \sum_{j=I+1}^{J} \max(\alpha_j, \beta_j)$$

$$m_I^- := \sum_{j=I+1}^{J} \min(\alpha_j, \beta_j)$$

Further, the discrimination result determination unit may be a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 5-1 or 6-1 given below and determines the discrimination result according to the overall evaluation value $F_I(x)$ obtained by evaluating the first to I$^{th}$ discriminators as a final result.

$$F_I(x) + b \times m_I^- \geq 0 \qquad \text{Condition 5-1}$$

$$F_I(x) + b \times m_I^+ \leq 0 \qquad \text{Condition 6-1}$$
where $0.0 < b < 1.0$ $$F_I(x) = \left(\sum_{j=1}^{I} f_j(x)\right) - T$$

$$m_I^+ := \sum_{j=I+1}^{J} \max(\alpha_j, \beta_j)$$

$$m_I^- := \sum_{j=I+1}^{J} \min(\alpha_j, \beta_j)$$

Still further, the discrimination result determination unit may be a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 3-2 or 4-2 given below and determines the discrimination result according to the overall evaluation value $F_I(x)$ obtained by evaluating the first to I$^{th}$ discriminators as a final result.

$$F_I(x) \geq 0 \text{ and } F_I(x) + m_I^- \geq 0 \qquad \text{Condition 3-2}$$

$$F_I(x) \leq 0 \text{ and } F_I(x) + m_I^+ \leq 0 \qquad \text{Condition 4-2}$$

where $F_I(x) = \left(\sum_{j=1}^{I} f_j(x)\right) - T$ $$m_I^+ := \sum_{j=I+1}^{J} \max(\alpha_j, \beta_j)$$

$$m_I^- := \sum_{j=I+1}^{J} \min(\alpha_j, \beta_j)$$

Further, the discrimination result determination unit may be a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 5-2 or 6-2 given below and determines the discrimination result according to the overall evaluation value $F_I(x)$ obtained by evaluating the first to I$^{th}$ discriminators as a final result.

$$F_I(x) \geq 0 \text{ and } F_I(x) + b \times m_I^- \geq 0 \qquad \text{Condition 5-2}$$

$$F_I(x) \leq 0 \text{ and } F_I(x) + b \times m_I^+ \leq 0 \qquad \text{Condition 6-2}$$
where $0.0 < b < 1.0$ $$F_I(x) = \left(\sum_{j=1}^{I} f_j(x)\right) - T$$

$$m_I^+ := \sum_{j=I+1}^{J} \max(\alpha_j, \beta_j)$$

$$m_I^- := \sum_{j=I+1}^{J} \min(\alpha_j, \beta_j)$$

Still further, the discrimination result may be determined according to a sign of the overall evaluation value $F_i(x)$.

In the case where the discriminator group is divided into "K" stages and each stage includes a discriminator group constituted by $J_k$ (k=1 to K) discriminators arranged in a predetermined order, it is preferable that the evaluation value obtaining unit is a unit that sequentially obtains an overall evaluation value $F_i(x)$ from i=1 to $J_k$ with respect to each stage and the discrimination result determination unit is a unit that instructs the evaluation value obtaining unit to terminate the evaluation of $I_k+1^{th}$ and subsequent discriminators in each stage if it is determined, based on a range of evaluation values that each of the $I_k+1^{th}$ and subsequent discriminators included in each stage can possibly take, that a discrimination result represented by an overall evaluation value $F_{kI}(x)$ obtained by evaluating the first to $I_k^{th}$ discriminators ($I_k<J_k$) of each stage by the evaluation value obtaining unit remains unchanged even if evaluation values of the $I_k+1^{th}$ and subsequent discriminators are added to the overall evaluation value $F_{kI}(x)$ obtained by evaluating the first to $I_k^{th}$ discriminators, and determines the discrimination result according to the overall evaluation value $F_{kI}(x)$ obtained by evaluating the first to $I_k^{th}$ discriminators as a final result of each stage.

A method of speeding up one of the rapid discrimination apparatuses described above is a method, including:

a sample data storage step wherein "N" sample data are stored;

a discriminator exchange step wherein two or more discriminators in the discriminator group constituted by a plurality of discriminators arranged in a predetermined order are exchanged to rearrange the order;

an evaluated discriminator count obtaining step wherein, in each of the states of the discriminator group before and after the exchange of the discriminators in the discriminator exchange step, each of the "N" sample data is accepted by the target data input accepting unit as the target data "x", a discriminator count "I" evaluated during a period after the function of the evaluation value obtaining unit is started and before termination of the evaluation of the discriminators is instructed by the discrimination result determination unit is obtained with respect to each sample data, and a representative value of the evaluated discriminator counts of the "N" sample data is obtained;

a rearrangement step wherein if the representative value of the discriminator count evaluated after the exchange is smaller than the representative value of the discriminator count evaluated before the exchange, the arrangement order of the discriminator group is changed to the arrangement order after the exchange and the changed arrangement order is stored in the discriminator group, while if the representative value of the discriminator count evaluated after the exchange is greater than the representative value of the discriminator count evaluated before the exchange, the arrangement order of the discriminator group is remained unchanged; and a search step wherein the discriminator exchange step, evaluated discriminator count obtaining step, and rearrangement step are repeated to search for an arrangement order of the discriminator group that minimizes the representative value of the evaluated discriminator counts.

A method of speeding up the other of the rapid discrimination apparatuses described above is a method, including:

a sample data storage step wherein "N" sample data are stored;

a discriminator exchange step wherein two or more discriminators in the discriminator group constituted by a plurality of discriminators arranged in a predetermined order are exchanged to rearrange the order with respect to each stage;

an evaluated discriminator count obtaining step wherein, in each of the states of the discriminator group before and after the exchange of the discriminators in the discriminator exchange step, each of the "N" sample data is accepted by the target data input accepting unit as the target data "x", a discriminator count "$I_k$" evaluated during a period after the function of the evaluation value obtaining unit is started and before termination of the evaluation of the discriminators is instructed by the discrimination result determination unit is obtained with respect to each sample data in each stage, and a representative value of the evaluated discriminator counts of the "N" sample data is obtained with respect to each stage;

a rearrangement step wherein if the representative value of the discriminator count evaluated after the exchange is smaller than the representative value of the discriminator count evaluated before the exchange, the arrangement order of the discriminator group is changed to the arrangement order after the exchange in each stage and the changed arrangement order is stored in the discriminator group, while if the representative value of the discriminator count evaluated after the exchange is greater than the representative value of the discriminator count evaluated before the exchange, the arrangement order of the discriminator group is remained unchanged; and a search step wherein the discriminator exchange step, evaluated discriminator count obtaining step, and rearrangement step are repeated to search for an arrangement order of the discriminator group that minimizes the representative value of the evaluated discriminator counts in each stage.

In the methods of speeding up the rapid discrimination apparatuses described above, it is preferable that the discriminator exchange step is a step wherein any two discriminators in the discriminator group constituted by a plurality of discriminators arranged in a predetermined order are exchanged, and the search step is a step wherein the evaluated discriminator count obtaining step and rearrangement step are repeated with respect to each combination of any two discriminators exchanged in the discriminator exchange step to search for an arrangement order of the discriminator group that minimizes the representative value of the evaluated discriminator counts.

The term "representative value" as used herein refers to an average value, mode value, or median value.

Preferably, the sample data are data that include unlabeled learning data.

Preferably, the discriminator group is a group selected through learning using learning data that follow a predetermined distribution P1 and the sample data include learning data with a distribution P2 different from the distribution P1.

Further, it is preferable that the distribution P2 is a distribution close to that of the target data.

According to the rapid discrimination apparatus of the present invention, when obtaining a final result from a discriminator group arranged in a predetermined order, each discriminator is evaluated from a first discriminator and if a discrimination result represented by an overall evaluation value obtained by evaluating the first to $I^{th}$ discriminators is determined to remain unchanged even if evaluation values of $I+1^{th}$ and subsequent discriminators are added to the overall evaluation value, the evaluation of the $I+1^{th}$ and subsequent discriminator is terminated and the discrimination result according to the overall evaluation value obtained by evaluating the first to $I^{th}$ discriminators is determined as a final result. This allows rapid discrimination without sacrificing the accuracy of discriminators.

Further, more rapid discrimination is achieved, with a certain degree of sacrifice in discrimination accuracy, by terminating the evaluation of the $I+1^{th}$ and subsequent discriminators even when the overall evaluation value obtained by evaluating discriminators up to $I^{th}$ discriminator has a certain amount of allowable error as in conditions 2, 5-1, 6-1, 5-2, and 6-2.

Further, in the rapid discrimination apparatus having a cascade structure in which the discriminators are divided into a plurality of stages, when a discrimination result represented by an overall evaluation value obtained by evaluating the first to $I_k^{th}$ discriminators is determined to remain unchanged even if evaluation values of $I_k+1^{th}$ and a subsequent discriminator are added to the overall evaluation value, if the evaluation of $I_k+1^{th}$ and a subsequent discriminator is terminated and the discrimination result according to the overall evaluation value obtained by evaluating the first to $I_k^{th}$ discriminators is determined as a final result in each stage "k", the speed of each stage may be increased in addition to speed increase due to the cascade structure.

According to the method of speeding up the rapid discrimination apparatus of the present invention, while rearranging the discriminator group arranged in a predetermined order, a representative value, such as an average value, mode value, or median value, of discriminator counts evaluated before the evaluation of discriminators is terminated with respect to "N" data samples to search for an arrangement order in which the evaluation of discriminators is terminated at a stage as early as possible. This allows the speed of the rapid discrimination apparatus of the present invention to be further increased.

According to the method of speeding up the cascade structure rapid discrimination apparatus, an arrangement order in which the evaluation of discriminators is terminated at a stage as early as possible is search for with respect each stage. This allows the speed of each stage to be increased in addition to discrimination in an early stage by the cascade structure as to whether or not there is an image that proceeds to the next step. Therefore, the speed of the rapid discrimination apparatus of the present invention may further be increased.

In order to search for an optimal arrangement order of the discriminator group, an optimal solution may be obtained by rearranging all discriminators, but the number of discriminators actually used for discriminating a face or the like amounts to more than 1000 and the rearrangement of all discriminators requires a huge amount of calculation. The exchange of any two discriminators in the discriminator group, as in the present invention, may reduce the amount of calculation and obtain a suboptimal solution close to the solution which may be obtained by rearranging all discriminators.

Further, inclusion of unlabeled learning data in the sample data used in searching for an optimal arrangement order of the discriminator group allows the size of the sample data to be increased, whereby a speed increase for various types of data may be achieved.

By searching for an arrangement order of the discriminator group using learning data used in selecting discriminators through learning by boosting and sample data that follow distribution different from that of the learning data, discriminators may be rearranged in the order which takes account the difference in distribution between labeled learning data used for boosting learning and sample data, whereby the speed of the rapid discrimination apparatus may further be increased.

Further, if the distribution of the sample data is made close to that of target data of actual discrimination target, a speed increase that takes into account the distribution of the target data may be achieved.

DESCRIPTION OF THE PREFERRED EMBODIMENTS

Hereinafter, embodiments of the present invention will be described in detail with reference to the accompanying drawings. The rapid discrimination apparatus of the present invention is realized when a rapid discrimination program built in a firmware is executed or when a rapid discrimination program is loaded on a computer, such as a personal computer, and executed. The rapid discrimination program may be distributed by being recoded on a storage medium, such as a CD-ROM, and installed on a computer from the CD-ROM. Otherwise, the program may be distributed via a network, such as the Internet, and installed on a computer or built in a firmware at the time of manufacturing a digital camera or digital video camera.

Figure 1:
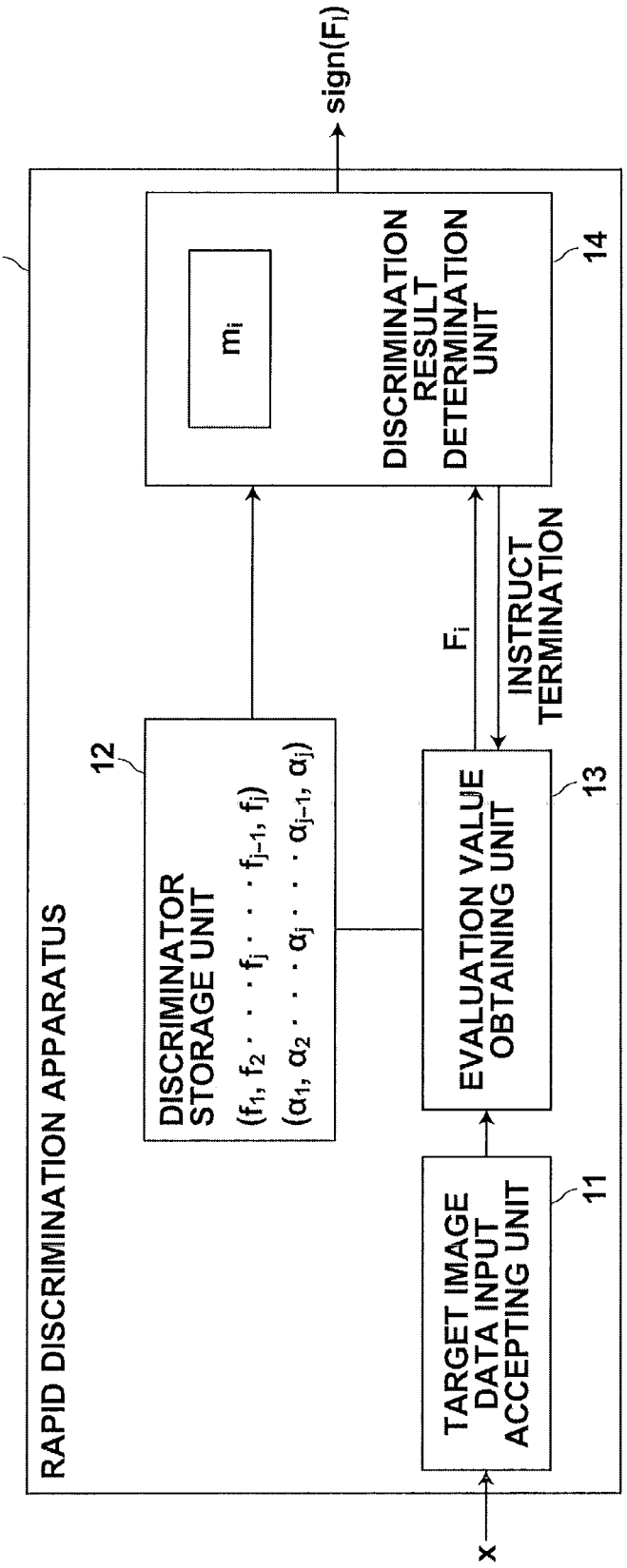
FIG. 1 is a block diagram of a rapid discrimination apparatus according to a first embodiment, illustrating the configuration thereof.
Figure 2:
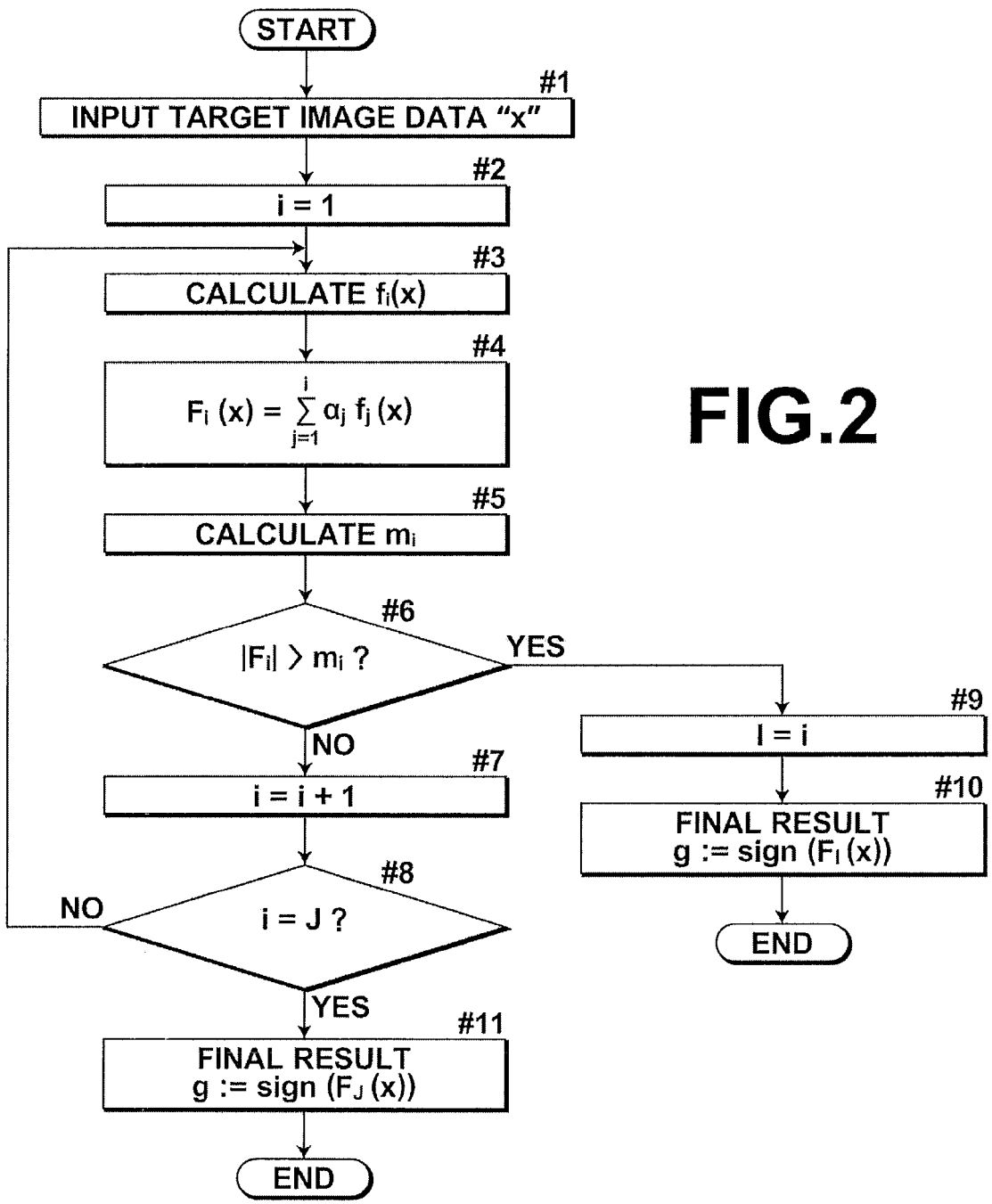
FIG. 2 is a flowchart illustrating a processing flow of the rapid discrimination apparatus according to the first embodiment.

A rapid discrimination apparatus according to a first embodiment will now be described with reference to FIGS. 1 and 2. FIG. 1 is a block diagram of a rapid discrimination apparatus 1 according to the first embodiment of the present invention, illustrating the configuration thereof. FIG. 2 is a flow chart illustrating a processing flow of the rapid discrimination apparatus 1.

As illustrated in FIG. 1, the rapid discrimination apparatus 1 includes a target data input accepting unit 11 that accepts input of target data "x", a discriminator storage unit 12 that stores a group of "J" discriminators $f_j$, an evaluation value obtaining unit 13 that obtains an overall evaluation value from a plurality of discriminators, and a discrimination result determination unit 14 that determines a final result from the overall evaluation value. In the present embodiment, a description will be made of a case in which discrimination of target data is performed using a boosting algorithm.

Figure 20:
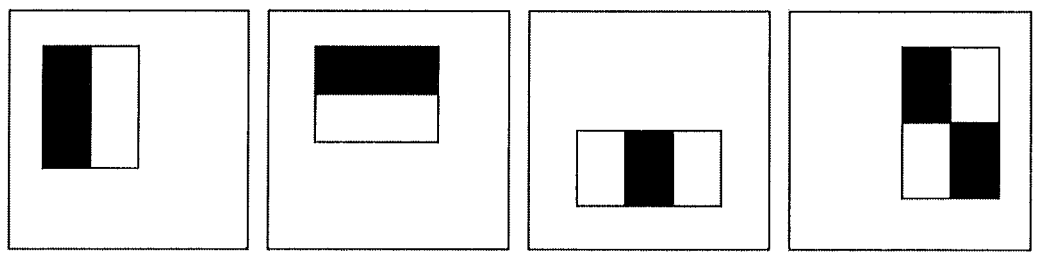
FIG. 20 illustrates a Haar-Like filter.

The discriminator storage unit 12 has stored therein "J" discriminators $f_j$ (discriminator group) arranged in a predetermined order. For example, in the case where the target data represent an image (hereinafter, target data are referred to as target image data) and discrimination is made as to whether or not a face is present in the target image data, a selection may be made from multiple of Haar-Like filters as the discriminators $f_j$ (refer to FIG. 20 and P. Viola and M. J. Jones, "Robust Real-Time Face Detection", International Journal of Computer Vision, vol. 57, pp. 137-154, 2004, and the like). Hereinafter, a description will be made of a case in which a face is detected as the object.

Note that at least one of "J" discriminators $f_j$ includes a weak classifier with a misclassification rate of less than ½ (hereinafter, a description will be made by taking a weak classifier as a discriminator and a weak classifier group that includes weak classifiers as a discriminator group). The boosting algorithm is an algorithm for creating a powerful discrimination apparatus by linearly combining "J" discriminators $f_j$ in which a weight (linear combination coefficient) $\alpha_j$ is determined for each weak classifier $f_j$ and stored in the discriminator storage unit 12 with the weak classifier group.

Now, a discrimination method using a powerful discrimination apparatus formed of "J" weak classifiers $f_j$ will be described. An evaluation value of target image data "x" evaluated using each weak classifier from $i^{th}$ to $J^{th}$ weak classifiers $f_j$ is expressed as $f_j(x)$. Here, the discrimination function "F" created by linear combination of "J" weak classifiers $f_j$ may be defined as follows.

$$F(x) = \sum_{j=1}^{J} \alpha_j f_j(x) \qquad (1)$$

where $\alpha_j \geq 0$ $$f_j(x) = \begin{cases} 1 & \text{if } x \in A_j \\ -1 & \text{otherwise} \end{cases} \quad A_j: \text{"True" area}$$

The final discrimination apparatus "g" is taken as follows.

$$g := \text{sign}(F(x)) \qquad (2)$$

Here, the sign represents a sign of the discrimination apparatus "g" and the final discrimination result of the apparatus is determined according to the sign (face is included if "g" is positive and face is not included if "g" is negative).

Note that the way the weak classifiers are linearly combined differs depending on the type of algorism used, and a description will be made taking a discrimination function F learned by AdaBoost as an example.

The number of "J" weak classifiers actually used for discriminating as to whether or not a face is included in image (target image) data captured by a digital camera or the like amounts to more than 1000. Actually, it is desirable that face detection from one target image data set is completed within 30 ms and it is not practical to perform evaluations constantly using all of the weak classifiers. In the AdaBoost, the weight $\alpha_j$ is determined such that the misclassification rate is reduced. Consequently, "J" weak classifiers are arranged in the order obtained by the boosting or in the descending order of weight, or the like. It may be conceivable to evaluate each of the weak classifiers in the order in which they are arranged and discrimination is terminated halfway to make the discrimination rapidly, but the termination causes a problem of degradation in accuracy of the discrimination.

In calculating the evaluation function "F", if the sign of the sign (F(x)) at the time when first to $I^{th}$ (<J) classifiers are evaluated does not change even when I+1$^{th}$ and subsequent classifiers are evaluated, termination of the evaluation of the I+1$^{th}$ and subsequent classifiers does not sacrifice the accuracy. Hereinafter, the method of the termination will be described in detail.

First, the target data input accepting unit 11 accepts target image data "x", the target of discrimination (#1). The target image data "x" are, for example, image data obtained by a digital still camera, one frame of image data obtained by a digital video camera, digital data captured by a scanner, or the like.

The evaluation value obtaining unit 13 obtains an evaluation value $f_j(x)$ of the target image data "x" evaluated by each weak classifier $f_j$ starting from the first classifier (#2, #3, #7, #8). An overall evaluation value $F_i(x)$ of the target image data "x" using first to $i^{th}$ (i>1) weak classifiers can be obtained by linearly combining evaluation values $f_j(x)$ (j=1 to i) of first to $i^{th}$ weak classifiers with weights $\alpha_i$. The overall evaluation value $F_i(x)$ is sequentially calculated from i=1 to "J" (#4).

$$F_i(x) = \sum_{j=1}^{i} \alpha_j f_j(x) \qquad (3)$$

Next, the discrimination result determination unit 14 obtains a total $m_i$ of the weights of i+1$^{th}$ and subsequent weak classifiers (#5).

$$\tilde{m}_i := \sum_{j=i+1}^{J} \alpha_j \qquad (4)$$

$(i = 1, 2, \ldots, J)$

An overall evaluation value F'$_i$ of evaluation values not yet evaluated by weak classifiers following the i$^{th}$ classifier can be obtained by the formula given below.

$$F'_i(x) = \sum_{j=i}^{F} \alpha_j f_j(x) \qquad (5)$$

An overall evaluation value evaluated by all of the weak classifiers is $F_i + F'_i$. Here, each weak classifier $f_j$ takes a value of −1 or 1 so that the F'$_i$ takes a value from −mi to +mi (formula 4). Therefore, if the evaluation is terminated after the evaluation by the first to i$^{th}$ weak classifiers that satisfy the following condition, without evaluating I+1$^{th}$ and subsequent weak classifiers, the sign of sign ($F_I(x)$) invariably corresponds to that of sign (F=$F_I$+F'$_I$(x)) obtained when all weak classifiers are evaluated.

Condition 1 \hfill (6)

$$F_I(x) = \left| \sum_{j=1}^{I} \alpha_j f_j(x) \right| > \sum_{j=I+1}^{J} \alpha_j$$

Consequently, if the overall evaluation value $F_I(x)$ from the first to I$^{th}$ weak classifiers satisfies the condition 1 (#6 is YES), the discrimination result determination unit 14 instructs the evaluation value obtaining unit 13 to terminate the evaluation of I+1$^{th}$ and subsequent weak classifiers. Further, the discrimination result determination unit 14 determines a final result from a sign of sign ($F_I(x)$) of the overall evaluation value $F_I(x)$ obtained by evaluating the first to I$^{th}$ weak classifiers (#9, #10).

Steps #3 to #8 are repeated until the condition 1 is satisfied, and if the termination does not occur, the final result is determined from a sign of sign ($F_J(x)$) of an overall evaluation value $F_J(x)$ obtained from all of "J" weak classifiers (#11).

Here the description has been made of a case in which $m_i$ is calculated by the discrimination result determination unit 14. The value of $m_i$ does not depend on the target image data "x" and may be calculated before discrimination is performed. By storing a lookup table of all values that can possibly be taken by $m_i$ in advance, the discrimination may be terminated at the time when I$^{th}$ weak classifier is evaluated. In this way, discrimination may be terminated halfway, whereby the discrimination may be made in a shorter time by the amount corresponding to the time required for evaluating J-I weak classifiers.

Next, a specific example of a termination method for terminating the evaluation of weak classifiers will be described. It is assumed here that a discrimination function shown below is given: F(x)=3$f_1$(x)+1.5$f_2$(x)+$f_3$(x)+0.5$f_4$(x)+0.3$f_5$(x).

(1) Now, it is assumed that the first term is evaluated as $f_1(x)=1$.

Then, $F_1(x)=3$ and $m_1=3.3$. At this stage, the evaluation cannot be terminated since the sign is reversed if all of the remaining weak classifiers take a value of −1.

(2) It is assumed that the second term $f_2(x)$ is evaluated as $f_2(x)=-1$. Then $F_2(x)=1.5$ and $m_2=1.8$. Here also, the evaluation cannot be terminated since the sign is reversed if all of the remaining weak classifiers take a value of $-1$.

(3) It is assumed that the third term $f_3(x)$ is evaluated as $f_3(x)=1$. Then, $F3(x)=2.5$ and $m_3=0.8$. Here, the condition 1 of formula (6) is satisfied and the sign is not reversed even if the remaining weak classifiers $f_4$, $f_5$ take any value and sign $(F(x))=$sign $(F_3(x))=1$. Therefore, the evaluation may be terminated at $\gamma(x, F)=3$.

If the evaluation of weak classifiers is terminated when the condition 1 is satisfied, the discrimination accuracy is not sacrificed. In the case where the discrimination is desired to be made more rapidly, the discrimination result determination unit 14 may terminate the evaluation at a weak classifier just before the condition 1 is satisfied. In this case, if the overall evaluation value $F_I(x)$ satisfies the condition 2 given below, discrimination result determination unit 14 gives an instruction to the evaluation value obtaining unit 13 not to perform the evaluation of $I^{th}$ and subsequent weak classifiers and determines a sign of sign $(F_I)$ of the overall evaluation value $F_I(x)$ obtained by evaluating the first to $I^{th}$ weak classifiers as a final result.

Condition 2

$$F_I(x) = \left| \sum_{j=1}^{I} \alpha_j f_j(x) \right| > b \times \sum_{j=I+1}^{J} \alpha_j \quad (7)$$

where $b$ is a coefficient,
and
$0.0 < b < 1.0$

The coefficient "b" is determined such that the correct answer rate is at least ½ when multiple sample data are actually evaluated. Preferably, the coefficient "b" is determined such that the correct answer rate becomes a desired percentage.

Figure 3:
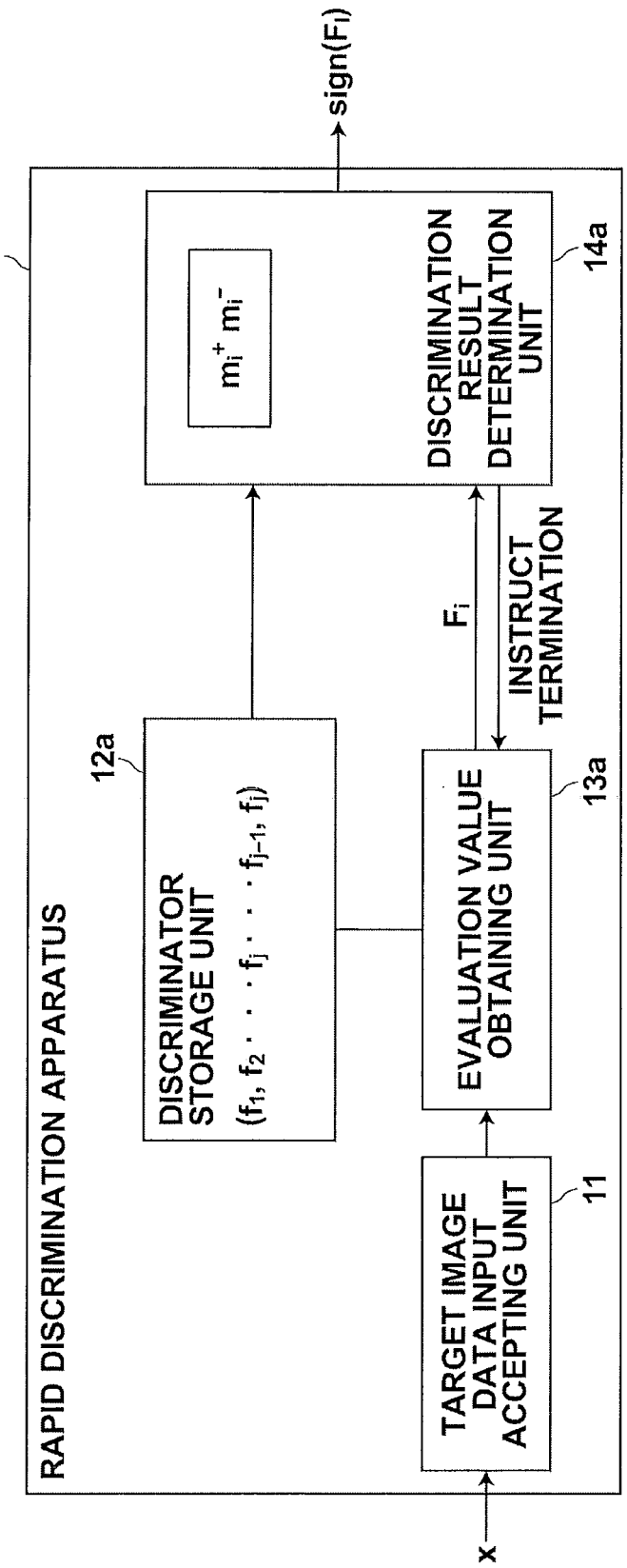
FIG. 3 is a block diagram of a rapid discrimination apparatus according to a second embodiment, illustrating the configuration thereof.
Figure 4:
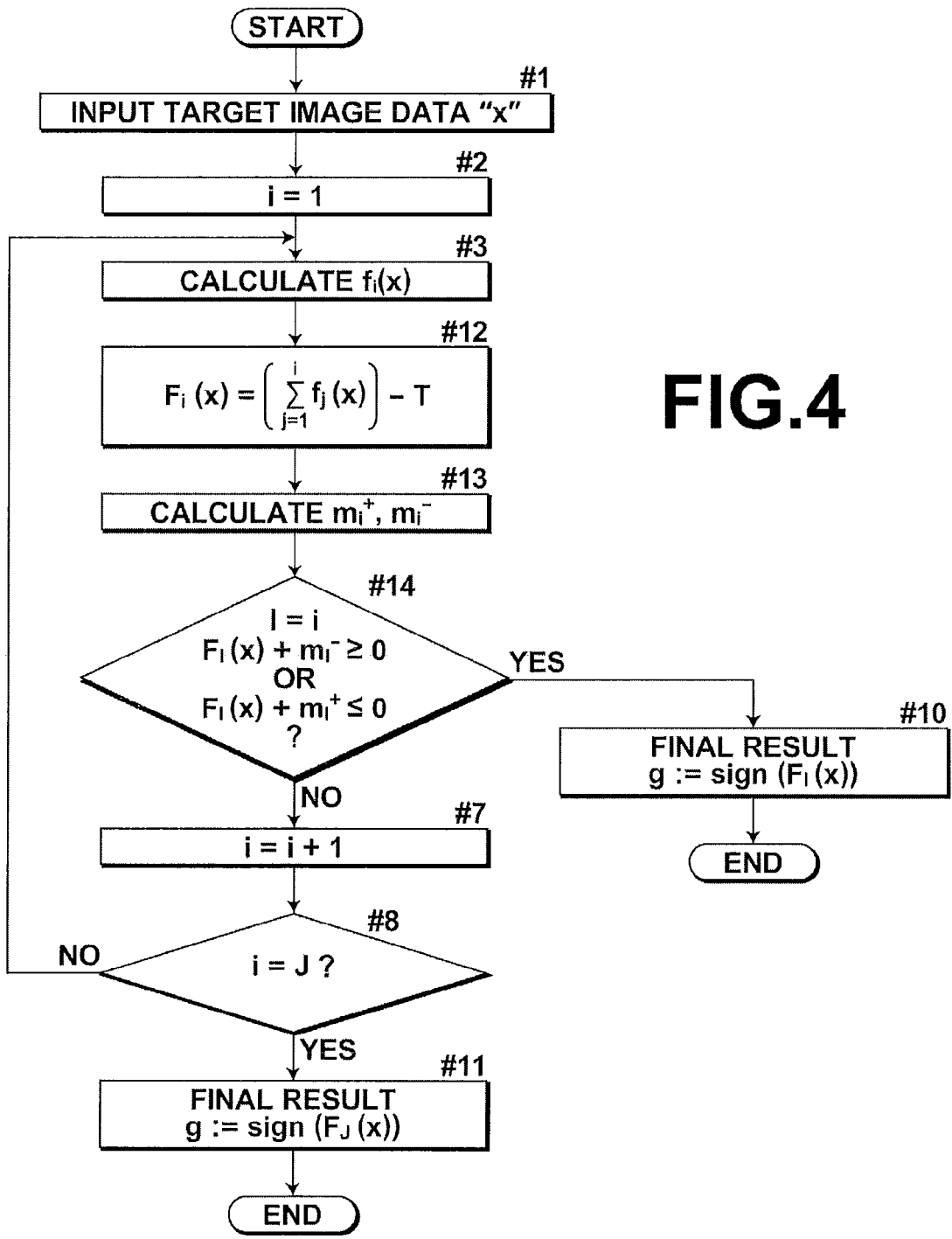
FIG. 4 is a flowchart illustrating a processing flow of the rapid discrimination apparatus according to the second embodiment.

Next, a second embodiment will be described with reference to FIGS. 3 and 4. In the second embodiment, a description will be made of a case in which extended weak classifiers are used. FIG. 3 is a block diagram of a rapid discrimination apparatus 1a according to the present embodiment, illustrating the configuration thereof. FIG. 4 is a flowchart illustrating a processing flow of the rapid discrimination apparatus 1a according to the present embodiment.

As illustrated in FIG. 3, the rapid discrimination apparatus 1a includes the target data input accepting unit 11, a discriminator storage unit 12a, an evaluation value obtaining unit 13a, and a discrimination result determination unit 14a. The rapid discrimination apparatus 1a of the present embodiment has a structure substantially identical to that of the first embodiment, so that the structure is not elaborated upon further here and only different points will be described here.

In the present embodiment, a description will be made of a case in which the weak classifiers $f_j$ stored in the discriminator storage unit 12a take one of two appropriate values of real numbers $\alpha_j$ and $\beta_j$, instead of one of two values of $-1$ and 1. (Note that $\alpha_j$ of the present embodiment is different from the weight $\alpha_j$ in the first embodiment.)

Here, the discrimination function "F" may be defined as follows using an appropriate threshold value "T".

$$F(x) = \left( \sum_{j=1}^{J} f_j(x) \right) - T \quad (8)$$

where $$f_j(x) = \begin{cases} \alpha_j & \text{if } x \in A_j \\ \beta_j & \text{otherwise} \end{cases}$$

$A_j$: "True" area $T$: threshold value

The final discrimination apparatus "g" is taken as follows.

$$g := \text{sign}(F(x)) \quad (9)$$

As in the first embodiment, the sign represents a sign of the discrimination apparatus "g" and the final discrimination result of the apparatus is determined according to the sign.

Also, in the present embodiment, "J" weak classifiers are arranged in the order obtained by the boosting (in ascending order of discrimination error) or in the descending order of weight, or the like. First, as in the first embodiment, the target data input accepting unit 11 accepts target image data "x" (#1).

Then, evaluation value obtaining unit 13a obtains an evaluation value $f_j(x)$ of the target image data "x" evaluated by each weak classifier $f_j$ starting from the first classifier (#2, #3, #7, #8), as in the first embodiment. Further, an overall evaluation value $F_i(x)$ of the target image data "x" when the target image data "x" is evaluated using first to $i^{th}$ weak classifiers is obtained. The overall evaluation value $F_i(x)$ is sequentially calculated from i=1 to "J" (#12).

$$F_i(x) = \left( \sum_{j=1}^{i} f_j(x) \right) - T \quad (10)$$

where $$f_J(x) = \begin{cases} \alpha_j & \text{if } x \in A_j \\ \beta_j & \text{otherwise} \end{cases}$$

$A_j$: Area where face is present $T$: threshold value $\alpha_j, \beta_j$: real numbers Next, the discrimination result determination unit 14a obtains a range of values that $i+1^{th}$ and subsequent weak classifiers can possibly take (#13).

$$m_i^+ := \sum_{j=i+1}^{J} \max(\alpha_j, \beta_j) \quad (11)$$

$$m_i^- := \sum_{j=i+1}^{J} \min(\alpha_j, \beta_j)$$

If the overall evaluation value $F_I(x)$ obtained by evaluating the first to $I^{th}$ weak classifiers satisfies the condition 3-1 or condition 4-1 given below, without evaluating $I+1^{th}$ and subsequent weak classifiers, the sign of sign $(F_I(x))$ invariably corresponds to that of sign $(F(x))$ obtained when all weak classifiers are evaluated.

Condition 3-1 (12-1)

$$F_I(x) + m_I^- \geq 0$$

Condition 4-1

$$F_I(x) + m_I^+ \leq 0$$

where $$F_I(x) = \left(\sum_{j=1}^{I} f_j(x)\right) - T$$

That is, sign (F(x))=1 is guaranteed if the condition 3-1 holds true. Similarly, sign (F(x))=−1 is guaranteed if the condition 4-1 holds true.

Consequently, if the overall evaluation value $F_I(x)$ from the first to $I^{th}$ weak classifiers satisfies the condition 3-1 or 4-1 (#14 is YES), the discrimination result determination unit 14a instructs the evaluation value obtaining unit 13a to terminate the evaluation of I+1$^{th}$ and subsequent weak classifiers. Further, the discrimination result determination unit 14a determines a sign of the sign ($F_J(x)$) of the overall evaluation value $F_I(x)$ obtained by evaluating the first to $I^{th}$ weak classifiers as a final result (#10).

Steps #3, #12, #13, #14, #7, and #8 are repeated until the condition 3-1 or 4-1 is satisfied, and if the termination does not occur, the final result is determined from a sign of sign ($F_J(x)$) of an overall evaluation value $F_J(x)$ obtained from all of "J" weak classifiers (#11). Further, if $m_I^+$ and $m_I^-$ are calculated with respect to each "I" and stored as a lookup table in advance, the discrimination may be terminated at the time when $I^{th}$ weak classifier is evaluated.

Next, a specific example of a termination method for terminating the evaluation using extended weak classifiers will be described. Here, the number of weak classifiers "J" is assumed to be J=5 and values that can possibly taken by the weak classifier are shown in Table 1 below.

TABLE 1

| j = | 1 | 2 | 3 | 4 | 5 |
|---|---|---|---|---|---|
| αj | 2.0 | 1.5 | 1.7 | 1.1 | 0.8 |
| βj | −1.0 | −2.5 | −0.2 | −1.7 | −0.9 |

Now the sign of F(x) is evaluated if a target image data "x" is given when the threshold value T=0.

(1) It is assumed that the first term is evaluated as $f_1(x)=2.0$. Then, $F_1(x)=2.0$ and $m^-_1=6.3$. Here, a possibility still remains that the sign of F(x) is negative since sign ($F_1(x)$)× $F_1(x)=2.0$ is smaller than $m^-_1$. Thus, the evaluation cannot be terminated.

(2) It is assumed that the second term is evaluated as $f_2(x)=1.5$. Then, $F_2(x)=3.5$ and $m^-_2=3.8$. Here, a possibility still remains that the sign of F(x) is negative since sign ($F_2(x)$)× $F_2(x)=3.5$ is smaller than $m^-_2$. Thus, the evaluation cannot be terminated.

(3) It is assumed that the third term is evaluated as $f_3(x)=1.7$. Then, $F_3(x)=5.4$ and $m^-_3=3.6$. Here, the overall evaluation value never becomes negative even if the remaining weak classifiers take any value since sign ($F_3(x)$)×$F_3(x)=$ $5.4>m^-_3$. Therefore, the discrimination may be terminated without evaluating the remaining weak classifiers.

If the evaluation of weak classifiers is terminated when the condition 3-1 or 4-1 is satisfied, the discrimination accuracy is not sacrificed. In the case where the discrimination is desired to be made more rapidly, the discrimination result determination unit 14a may terminate the evaluation at a weak classifier just before the condition 3-1 or 4-1 is satisfied. In this case, if the overall evaluation value $F_I(x)$ satisfies the condition 5-1 or 6-1 given below, discrimination result determination unit 14a gives an instruction to the evaluation value obtaining unit 13a to terminate the evaluation of I+1$^{th}$ and subsequent weak classifiers.

Condition 5-1 $F_1(x)+b\times m^-_1\geq 0$

Condition 6-1 $F_1(x)+b\times m^+_1\leq 0$ (13-1)

where b is a coefficient, and 0.0<b<1.0

The discrimination result determination unit 14a determines a sign of sign ($F_J(x)$) of the overall evaluation value $F_I(x)$ obtained by evaluating the first to $I^{th}$ weak classifiers as a final result. The coefficient "b" is determined such that the correct answer rate is at least ½ when multiple sample data are actually evaluated. Preferably, the coefficient "b" is determined such that the correct answer rate becomes a desired percentage.

In the second embodiment described above, the discrimination result determination unit 14a terminates the evaluation at the $I^{th}$ weak classifier if condition 3-1 or 4-1 is satisfied, but the evaluation may be terminated at the $I^{th}$ weak classifier if condition 3-2 or 4-2 given below is satisfied.

Condition 3-2 (12-2)

$$F_I(x) \geq 0$$

and $$F_I(x) + m_I^- \geq 0$$

Condition 4-2

$$F_I(x) \leq 0$$

and $$F_I(x) + m_I^+ \leq 0$$

where $$F_I(x) = \left(\sum_{j=1}^{I} f_j(x)\right) - T$$

When the condition 3-2 or 4-2 is satisfied, if the discrimination is desired to be made more rapidly, the discrimination result determination unit 14a may terminate the evaluation at a weak classifier just before the condition 3-2 or 4-2 is satisfied. In this case, if the overall evaluation value $F_I(x)$ satisfies the condition 5-2 or 6-2 given below, discrimination result determination unit 14a instructs the evaluation value obtaining unit 13a to terminate the evaluation of $I^{th}$ and subsequent weak classifiers.

Condition 5-2 $F_1(x)\geq 0$ and $F_1(x)+b\times m_1^-\geq 0$

Condition 6-2 $F_1(x)\leq 0$ and $F_1(x)+b\times m_1^+\leq 0$ (13-2)

where b is a coefficient, and 0.0<b<1.0

The discrimination result determination unit 14a determines a sign of sign ($F_J(x)$) of the overall evaluation value $F_I(x)$ obtained by evaluating the first to $I^{th}$ weak classifiers as a final result. The coefficient "b" is determined such that the correct answer rate is at least ½ when multiple sample data are actually evaluated. Preferably, the coefficient "b" is determined such that the correct answer rate becomes a desired percentage.

In a third embodiment, a method for speeding up a rapid discrimination apparatus will be described.

Heretofore, the arrangement order of a weak classifier group selected by the boosting is designed based on the assumption that all weak classifiers are used. Thus, in the case where discrimination is performed only by some of the weak classifiers instead of using all of the classifiers while not sacrificing accuracy, there existed inevitably a speed-up limitation. Consequently, optimal arrangement order of the weak classifiers for further enhancing the discrimination speed will be discussed. Acquisition of such optimal arrangement order of weak classifiers for rapid discrimination is, hereinafter, referred to as the "ordinal structure learning".

First, N sample data are provided in a sample data storage step. Here, each sample data is represented as $x_s$ (s=1 to N).

In the rapid discrimination apparatus described above, "J" weak classifiers $f_1, f_2, \text{---}, f_j, \text{---}, F_{J-1}, F_J$ are arranged in the descending order of weight. Here, multiple weak classifier groups are generated, in which two or more weak classifiers in each group are exchanged, and a discussion will be made as to which of the arrangement orders is optimal. An arrangement order of weak classifier group obtained by a certain exchange will be represented using a letter "k", with k(i) as a suffix attached to a weak classifier after exchange and the weak classifier is represented as $f_{k(j)}$. The discrimination function when a weak classifier group arranged in the order of "k" is represented as $F_k$. The use of the arrangement order of "k" allows the $F_k$ to be expressed as follows (in the present embodiment, a description will be made of a case in which a weak classifier takes a value of 1 or −1 and the discrimination function "F" is created by linear combination of weak classifiers using a weight $\alpha_j$, as in the first embodiment).

$$F_k(x) = \sum_{j=1}^{J} \alpha_{k(j)} f_{k(j)}(x) \quad (14)$$

Here, the condition of the termination may be expressed as in the formula given below.

$$\left| \sum_{j=1}^{I} \alpha_{k(j)} f_{k(j)}(x) \right| > \sum_{j=I+1}^{J} \alpha_{k(j)} \quad (15)$$

When a sample data $x_s$ is evaluated by a rapid discrimination apparatus 1 formed of weak classifier group arranged in each arrangement order of "k", the number of weak classifiers "I" evaluated by the evaluation value obtaining unit 13 of the rapid discrimination apparatus 1 by the time when the termination of evaluation of weak classifiers is instructed by the discrimination result determination unit 14 is expressed as "γ".

$$\gamma(F, x_s, k) = \min \left( I \left\| \sum_{j=1}^{I} \alpha_{k(j)} f_{k(j)}(x) \right\| > \sum_{j=I+1}^{J} \alpha_{k(j)} \right) \quad (16)$$

With respect to each of "N" sample data $x_s$ (s=1, 2, ---, N), γ is obtained using a rapid discrimination apparatus with an arrangement order of ˆk and a average value Γ(F, k) of γs of "N" sample data is obtained.

$$\Gamma(F, k) = \frac{1}{N} \sum_{s=1}^{N} \gamma(F, x_s, k) \quad (17)$$

Then, an arrangement order ˆk that minimizes the average value Γ(F, k) of the number of evaluated weak classifiers is obtained.

In the mean time, when considering the nature of the termination method described above, the order in which the weak classifiers are arranged in the descending order of absolute value of coefficient of each weak classifier seems to be the optimal order. The reason is that weak classifiers with absolute values of small coefficients are arranged in a latter half and the value of "$m_j$" is small even when the number of weak classifiers evaluated by the evaluation value obtaining unit 13 is small, so that it is very likely that the evaluation may be terminated earlier. This might lead to think that it is not necessary to purposely conduct ordinal structure learning and, for example, the following two arrangement orders are optimized in the first place.

Order of boosting ˆ$k_b$: order selected during the learning by boosting; and

Order of absolute value of coefficient ˆ$k_a$: order in which absolute value of coefficient (weight a) of each weak classifier is arranged in descending order.

But the following counter example may actually be provided. Here, the feature value of sample data is represented by "x" (in the present embodiment, description is made that "x" represents a feature value), and a discrimination result is represented by "y" (true: y=1, false: y=−1) A marginal distribution p(x) of the feature value "x" is expressed as follows.

$$p(x) = \begin{cases} 0.9 & x \in [0, 1/3] \\ 1.8 & x \in [1/3, 2/3] \\ 0.3 & x \in [2/3, 1] \end{cases} \quad (18)$$

As a result, a probability that a feature value "x" corresponding to each of the regions $R_1:=[0, \frac{1}{3}]$, $R_2:=[\frac{1}{3}, \frac{2}{3}]$, and $R_3:=[\frac{2}{3}, 1]$ occurs is like that shown below.

$p(x \in R_1) = 0.3$ $p(x \in R_2) = 0.6$ $p(x \in R_3) = 0.1 \quad (19)$

Figure 5:
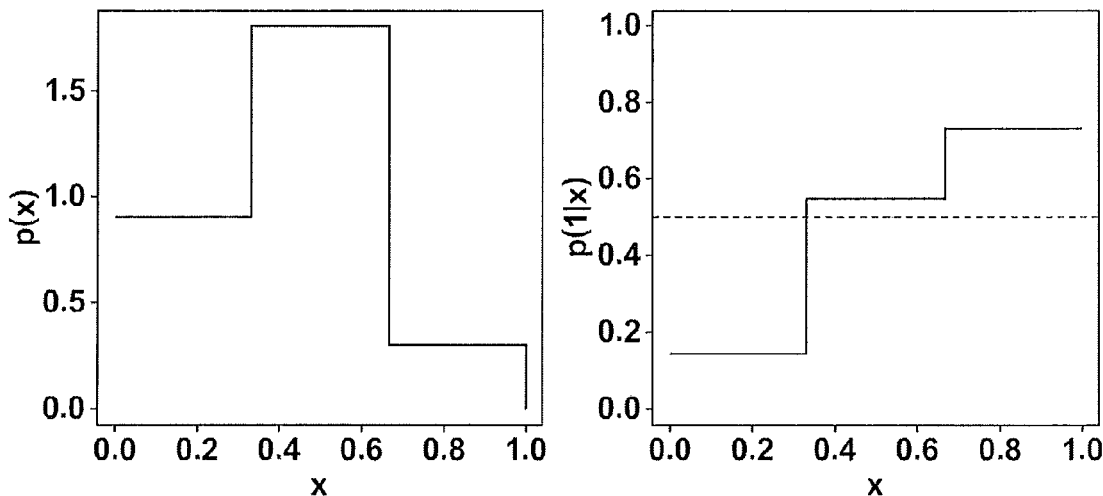
FIG. 5 illustrates, by way of example, a probability density function and a true conditional distribution of feature values of sample data.

Further, a true conditional distribution p(y|x) (y=1) is set as follows.

$$p(1|x) := \begin{cases} 0.14 & x \in R_1 \\ 0.55 & x \in R_2 \\ 0.62 & x \in R_3 \end{cases} \quad (20)$$

p(x) and p(1/|x) are shown in FIG. 5.

Now suppose that "n" sample data are given from a joint distribution p(x, y)=p(x)p(y|x) as D:={(xi, yi)|i=1, 2, ---, n}.

The graph on the left side of FIG. 5 shows a probability density function p(x), and the graph on the right side shows p(1|x). The dotted line in the graph shows p(1|x)=½.

Figure 6:
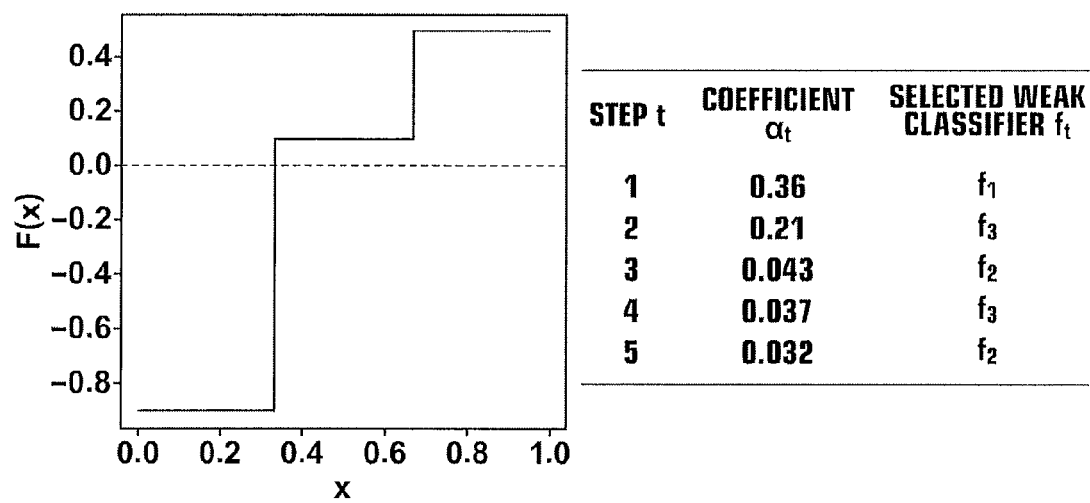
FIG. 6 illustrates a relationship between a weak classifier selected by AdaBoost and a coefficient thereof.

The graph on the left side of FIG. 6 shows a discrimination function obtained by AdBoost and the table on the right side shows, when the AdaBoost algorithm is actually performed with "N" sample data, the weak classifier and its coefficient (weight) obtained at each step.

Now, it is assumed that learning is performed by AdaBoost using three weak classifiers $f_1$, $f_2$, and $f_3$.

$$f_1(x)=\text{sign}(x-0.3)$$

$$f_2(x)=-\text{sign}(x-0.3)\cdot\text{sign}(x-0.5)$$

$$f_3(x)=\text{sign}(x-0.5) \quad (21)$$

At this time, if the sample data and the number of steps are sufficiently large, it is well known that the discrimination function of AdaBoost is like that shown below (Non-patent Document 2: J. H. Friedman, et al., "Additive logistic regression: A statistical view of boosting", The Annals of Statistics, vol. 28, pp. 337-407, 2000).

$$F(x) = \frac{1}{2}\log\frac{p(1|x)}{p(-1|x)} = 0.3f_1(x) + 0.2f_2(x) + 0.4f_3(x) \quad (22)$$

Note that the coefficients of the same weak classifier are summed up. When sequential learning of AdaBoost was actually performed with n=1000, $0.35*f_1(x)+0.15*f_2(x)+0.38*f_3(x)$ was obtained. For the purpose of simplification, the discussion will be proceeded with F(x) described above as the discrimination function obtained by the AdaBoost. From the table on the right side of FIG. 6, it is known that the order of weak classifiers selected by the AdaBoost is $f_1$, $f_3$, and $f_2$. In the mean time, it is known that the order is $f_3$, $f_1$, and $f_2$ in terms of the order of absolute value of coefficient. Now, if $\Gamma(F)$ is calculated for all arrangement orders of $f_1$, $f_2$, and $f_3$, the result is like that shown in Table 2 given below. Table 2 shows that neither the order of boosting nor the order of absolute value of coefficient is optimal order.

Table 2 given below shows values of $\Gamma(F)$ with respect to each order "k". In Table 2, the order "123" denotes that the weak classifiers are arranged in $F(x)=\alpha_1 f_1(x)+\alpha_2 f_2(x)+\alpha_3 f_3(x)$. Note that each value in the sixth column $\Gamma(F)$ may be calculated as Ab when each value in the second, third, and fourth columns is taken as one matrix "A" of 6×3 and each value in the fifth column is taken as a three-dimensional column vector "b".

It may be confirmed that the (1) above holds true from the example described above. In the region $R_2$, the order of absolute value of coefficient $f_3$, $f_1$, $f_2$ needs to evaluate all week classifiers while the order $f_1$, $f_2$, $f_3$ may terminate the evaluation after two week classifiers. That is, the order of absolute value of coefficient $\hat{k}_d$ does not necessarily minimize the $\gamma(x, F)$ at all places.

It is known from the (1) and (2) above that the order of absolute value of coefficient $\hat{k}_d$ is not optimum. It is known from formula (22) that the discrimination function of AdaBoost depends only on p(y|x). In contrast, it is known that the ordinal structure learning depends also on the p(x) from the definition thereof. Thus, the (2) holds true. Now, if the (2) described above is admitted to be true, then $\hat{k}_d$ is not changed with the change in p(x). But, as the probability that the data occur in the region $R_2$ increases, the $\Gamma(F)$ in the region is degraded for the $\hat{k}_d$. Actually, the probability of data occurrence in the region $R_2$ is highest in the example described above, so that $\hat{k}$ that can terminate earliest at the region may make the $\Gamma(F)$ smaller than the $\hat{k}_d$. In fact the p(x) is created for satisfying the above. It is known from (1) and (3) above that the order of boosting $\hat{k}_d$ is not optimum. In fact, (3) described above is known for long through, for example, Non-patent Document 2 and the like. In the order of boosting, $f_1$ is selected in step 1 in FIG. 6. The optimal order may be obtained if $f_2$ were selected next, but $f_3$ is selected in the order of boosting because it is advantageous to select $f_3$ in order to bring the overall form close to the form of F(x). That is, the goal of the boosting is to bring the form close to F(x) and is not related to terminate the evaluation as early as possible. Consequently, the order in the boosting is generally different from the optimal order. The above example is one of such specific examples.

Consequently, the optimal order $\hat{k}$ is obtained by obtaining an average value (number of evaluations) $\Gamma$ of evaluated weak classifiers with respect to all arrangement orders of weak classifier groups in which the arrangement order of weak classifiers is changed. It may be the best way to search for all arrangement orders and obtain the optimal order $\hat{k}$, but the number of all arrangement orders of "J" weak classifiers is "J!" and the total number of weak classifiers amounts to not less than 1000, so that it is impossible to actually perform the searching.

TABLE 2

| ORDER | $\gamma(x, F)$ | | | PROBABILITY OF FALLING IN EACH REGION | $\Gamma(F)$ | |
|---|---|---|---|---|---|---|
| | $R_1$ | $R_2$ | $R_3$ | | | |
| 123 | 2 | 2 | 3 | | 2.1 | ORDINAL STRUCTURE LEARNING $\hat{k}$ |
| 132 | 2 | 3 | 2 | $P(x \in R_1) = 0.3$ | 2.6 | ORDER OF BOOSTING $\hat{k}_b$ |
| 213 | 2 | 2 | 3 | $P(x \in R_2) = 0.6$ | 2.1 | ORDINAL STRUCTURE LEARNING $\hat{k}$ |
| 231 | 2 | 3 | 3 | $P(x \in R_3) = 0.1$ | 2.7 | |
| 312 | 2 | 3 | 2 | | 2.6 | ORDER OF ABSOLUTE VALUE OF COEFFICIENT $\hat{k}_d$ |
| 321 | 2 | 3 | 3 | | 2.7 | |

The following three facts are deeply related to the reason why such a phenomenon occurs.
(1) The order that may achieve a minimal $\gamma(x, F)$ differs according to the place "x".
(2) The optimal discrimination function F(x) depends only on p(y|x). In contrast, the optimal ordinal structure depends also on p(x).
(3) In the order of boosting, weak classifiers are selected so as to be approached to the final form F(x) in a shortest time.

As such, a method of efficiently obtaining the arrangement order $\hat{k}$ of weak classifiers will be discussed herein below.

When a limited number of weak classifiers are selected from a weak classifier group arranged in a predetermined order and the arrangement order of the selected weak classifiers is changed, if $\Gamma$ becomes smaller than that before the change, the selected weak classifiers are exchanged. It may be considered that a suboptimal solution of the arrangement order of weak classifiers may be obtained by repeating this operation until the $\Gamma$ is not reduced any more.

Figure 7:
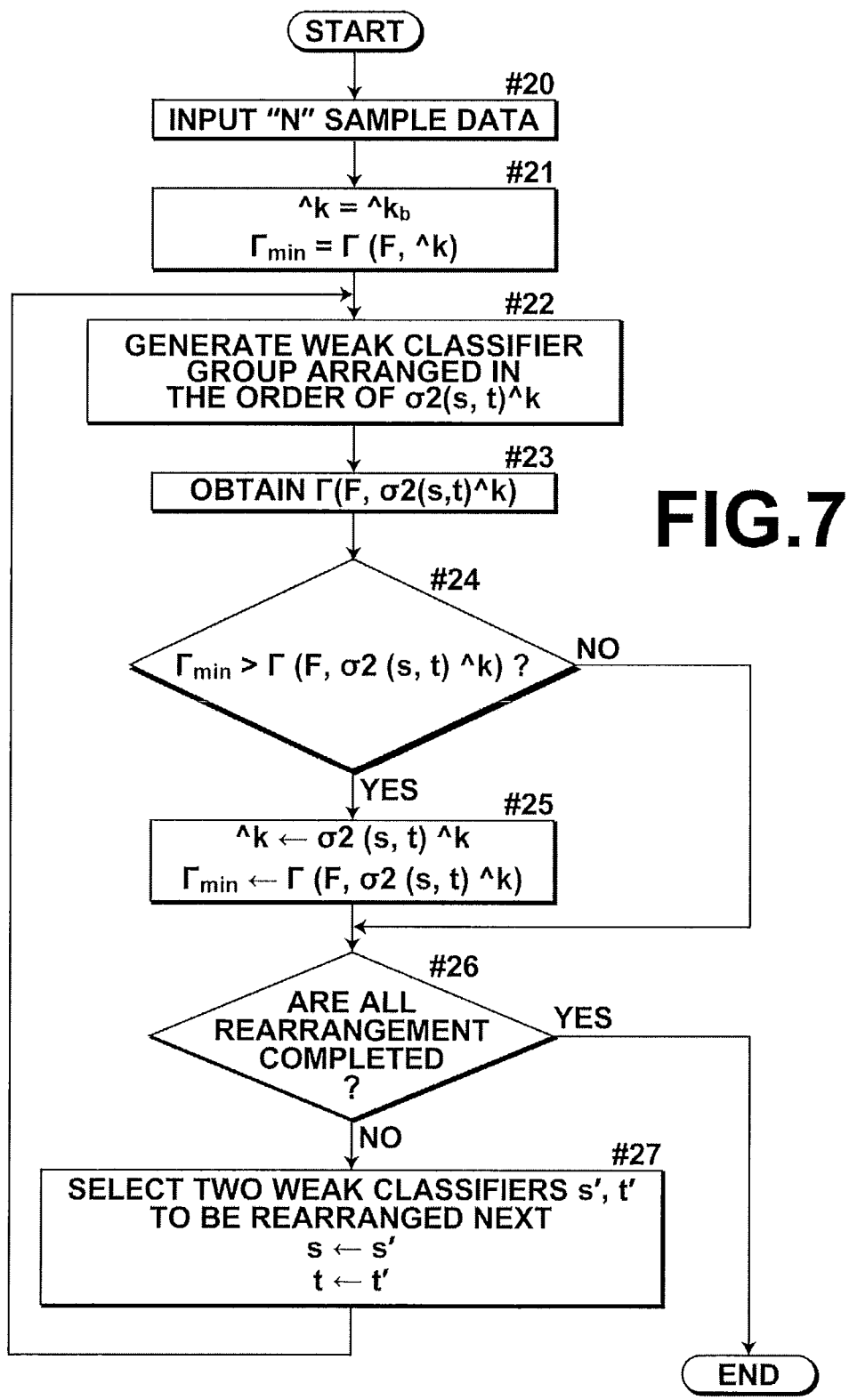
FIG. 7 is a flowchart illustrating a processing flow of ordinal structure learning according to a third embodiment.

Here, a description will be made of a case in which the arrangement order of two weak classifiers in a weak classifier group is changed with reference to the flowchart of FIG. 7.

First, N sample data are provided and stored in a storage device such as a hard disk or the like in a sample data storage step (#20).

Next, an order of absolute value of coefficient $\hat{k}_b$ of weak classifiers $f_j$ selected by boosting is taken as an initial value of $\hat{k}$. Further, $\Gamma(F, \hat{k})$ at this time is taken as an initial value of $\Gamma_{min}$ (#21).

In the weak classifier exchange step, any two weak classifiers are exchanged in a weak classifier group in which a plurality of weak classifiers is arranged in a predetermined order. Here, an exchanging operation of $s^{th}$ weak classifier with $t^{th}$ weak classifier is represented as σ2 (s, t) and defined as σ2 (s, t)={1, 2, - - - , s, - - - , t, - - - , J}→{1, 2, - - - , t, - - - , s, - - - , J}. A weak classifier group with a new arrangement order σ2 (s, t) $\hat{k}$ is generated by exchanging the two weak classifiers arranged in the $s^{th}$ and $t^{th}$ places (#22).

Then, in the evaluated weak classifier quantity obtaining step, each of N sample data is accepted by the target data input accepting unit 11 as the target image data "x" and a value of $\Gamma$ (F, σ2 (s, t) $\hat{k}$) at the post exchange arrangement order σ2(s,t)$\hat{k}$ is obtained (#23).

In the arrangement order change step, if the $\Gamma(F, \sigma2(s,t)\hat{k})$ after the exchange is smaller than the $\Gamma_{min}$ before the exchange (#24 is YES), the arrangement order of the weak classifiers is changed to the post exchange arrangement order σ2(s,t)$\hat{k}$ and stored, and the $\Gamma(F, \sigma2(s,t)\hat{k})$ is set to $\Gamma_{min}$ (#25). On the other hand, if the $\Gamma(F, \sigma2(s,t)\hat{k})$ after the exchange is larger than the $\Gamma_{min}$, before the exchange (#24 is NO), the arrangement order of the weak classifier group is remained unchanged.

In the search step, weak classifiers "s'" and "t'" to be exchanged next are selected and "s'" is taken as "s" and t "t'" is taken as "t" (#27), the weak classifier exchange step, evaluated weak classifier quantity obtaining step, and arrangement order change step are repeated (#22 to #27) to search for the arrangement order of weak classifiers that minimizes the average number of weak classifiers evaluated. The number of all combinations in which two of one to "J" weak classifiers are exchanged in the weak classifier exchange step is $_JC_2$. Thus, the weak classifier exchange step, evaluated weak classifier quantity obtaining step, and arrangement order change step are repeated (#26 is NO) until $_JC_2$ exchanges are completed (#26 is YES).

In the description above, a suboptimal arrangement order of a weak classifier group is obtained by exchanging two weak classifiers in the weak classifier group step by step, but the suboptimal arrangement order may be obtained by exchanging three weak classifiers in a weak classifier group step by step.

Three weak classifiers are selected from a weak classifier group in the weak classifier exchange step, then arrangement order exchanges σ3 of five patterns in Table 3 given blow are performed with respect to the three weak classifiers, and an average number of evaluations $\Gamma$ is calculated in the evaluated weak classifier quantity obtaining step. In the arrangement order change step, a change in the arrangement order that improves the average number of evaluations $\Gamma$ than that prior to the exchange and minimizes the average number of evaluations $\Gamma$ among five results is adopted and arrangement order of the weak classifier group is updated. In the search step, the weak classifier exchange step, evaluated weak classifier quantity obtaining step, and arrangement order change step are repeated to search for the arrangement order of the weak classifier group that minimizes the average number of weak classifiers evaluated. The number of all combinations in which three weak classifiers are exchanged is $_JC_3*5$. Therefore, the weak classifier exchange step, evaluated weak classifier quantity obtaining step, and arrangement order change step are repeated until $_JC_2*5$ exchanges are completed in order to search for a suboptimal arrangement order.

TABLE 3

| | | | |
|---|---|---|---|
| σ3(s, t, u, 1) | = | {1, 2, . . . , s, . . . , t, . . . , u, . . . , J} → | {1, 2, . . . , s, . . . , u, . . . , t, . . . , J} |
| σ3(s, t, u, 2) | = | {1, 2, . . . , s, . . . , t, . . . , u, . . . , J} → | {1, 2, . . . , t, . . . , s, . . . , u, . . . , J} |
| σ3(s, t, u, 3) | = | {1, 2, . . . , s, . . . , t, . . . , u, . . . , J} → | {1, 2, . . . , t, . . . , u, . . . , s, . . . , J} |
| σ3(s, t, u, 4) | = | {1, 2, . . . , s, . . . , t, . . . , u, . . . , J} → | {1, 2, . . . , u, . . . , s, . . . , t, . . . , J} |
| σ3(s, t, u, 5) | = | {1, 2, . . . , s, . . . , t, . . . , u, . . . , J} → | {1, 2, . . . , u, . . . , t, . . . , s, . . . , J} |

It is predicted that the case where three weak classifiers are exchanged in a weak classifier group step by step may provide a result which is closer to the optimal solution in comparison with the case in which two weak classifiers are exchanged in the weak classifier group step by step. But the number of repetitions of the weak classifier exchange step, evaluated weak classifier quantity obtaining step, and arrangement order change step is undoubtedly increased and the amount of calculation for obtaining the suboptimal solution becomes large than in the case in which two weak classifiers are exchanged in a weak classifier group step by step.

Advantageous effects of ordinal structure learning based on experimental results will now be described.

In Experiment 1, experimental results of advantageous effects of ordinal structure learning (learning by SL (1)) in which all changes in arrangement order of a weak classifier group are performed (all solution finding) and of ordinal structure learning (learning by SL (2)) in which the order of two weak classifiers in a weak classifier group is exchanged will be described.

Figure 8:
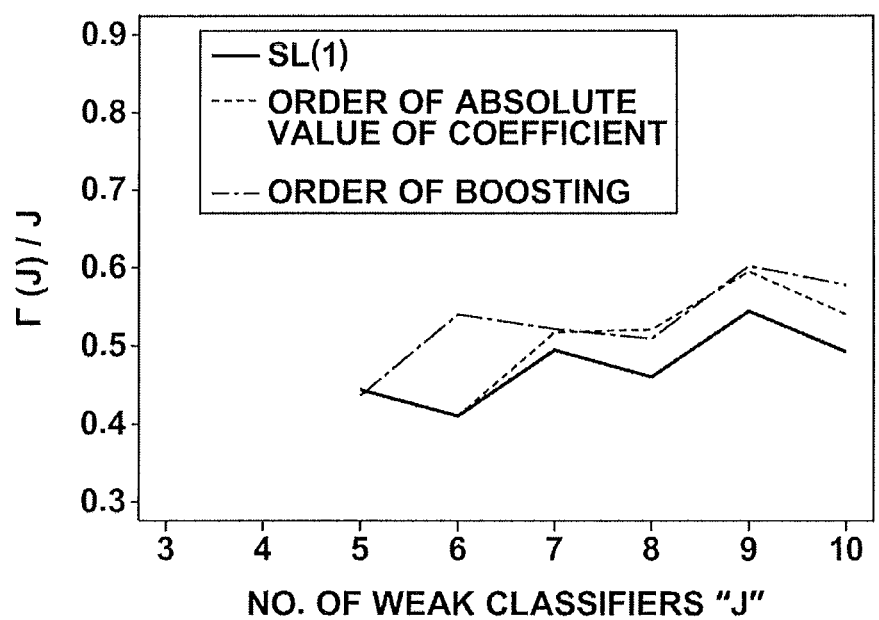
FIG. 8 is a graph illustrating an average number Γ of weak classifiers evaluated when ordinal structure learning is performed through a finding all solutions method.
Figure 9:
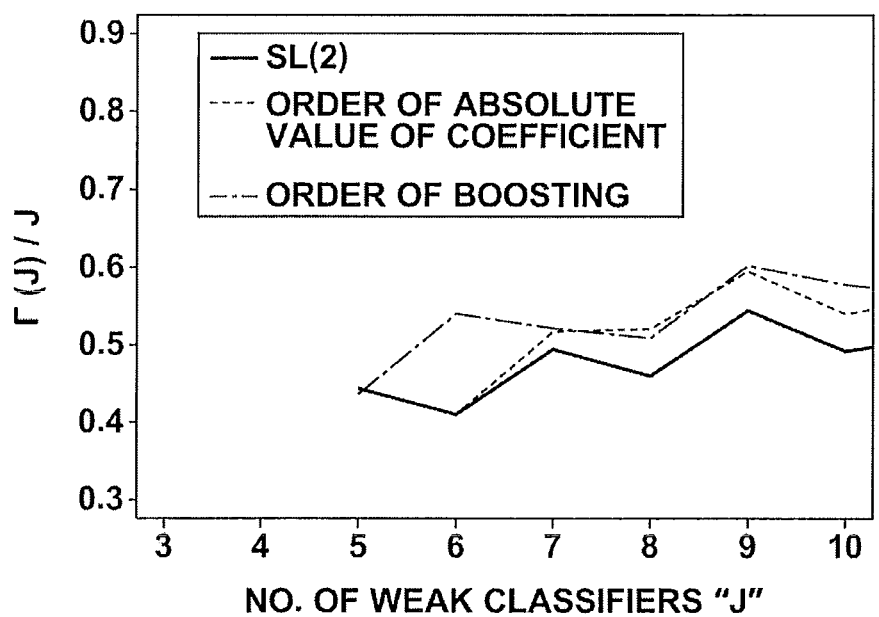
FIG. 9 is a graph illustrating an average number Γ of weak classifiers evaluated when ordinal structure learning is performed by exchanging two weak classifiers.

Average numbers of evaluations $\Gamma$ performed by rapid discrimination apparatus 1 of five to ten weak classifiers, in consideration of calculation amounts, subjected to ordinal structure learning by SL (1) and SL (2) are shown in Table 4 below. In addition, FIG. 8 shows average numbers of evaluations $\Gamma$ when ordinal structure learning is performed by SL (1), and average numbers of evaluations $\Gamma$ by the order of boosting $\hat{k}_b$ and order of absolute value of coefficient $\hat{k}_d$ (order of weight of weak classifier). Further, FIG. 9 shows average numbers of evaluations $\Gamma$ when ordinal structure learning is performed by SL (2), and average numbers of evaluations $\Gamma$ by the order of boosting $\hat{k}_b$ and order of absolute value of coefficient $\hat{k}_d$. FIGS. 8 and 9 show that the average numbers of evaluations $\Gamma$ when ordinal structure learning is performed by SL (1) or SL (2) are smaller than the average numbers of evaluations $\Gamma$ by the order of boosting $\hat{k}_b$ or order of absolute value of coefficient $\hat{k}_d$ (order of weight of weak classifier), that is, ordinal structure learning allows rapid evaluations. Table 4 shows that values of SL (2) are good approximations of the values of SL (1) in a range in which "J" is small. That is, it may be considered that the ordinal structure learning by SL (2) provides a result similar to that of the ordinal structure learning by SL (1).

TABLE 4

| J | Γ (J) of SL (2) | Γ (J) of SL (1) |
|---|---|---|
| 5 | 2.22000 | 2.220000 |
| 6 | 2.462500 | 2.462500 |
| 7 | 3.462500 | 3.462500 |
| 8 | 3.682500 | 3.682500 |
| 9 | 4.900833 | 4.900833 |
| 10 | 4.923333 | 4.923333 |

Figure 10:
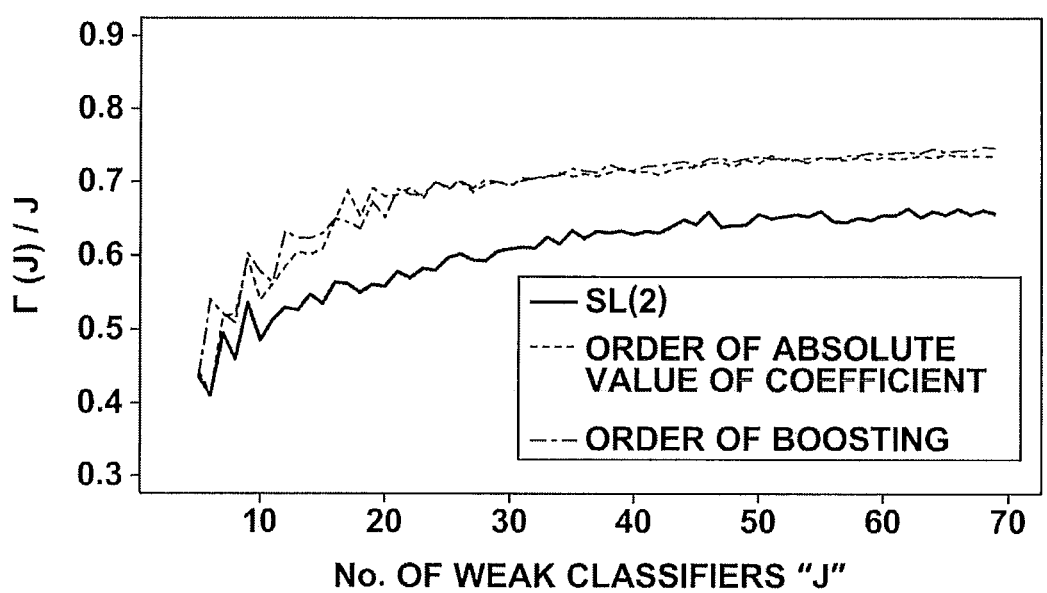
FIG. 10 is a graph illustrating an average number Γ of weak classifiers evaluated when ordinal structure learning is performed by increasing the number of weak classifiers and exchanging two weak classifiers.

In Experiment 2, the number of weak classifiers is increased and a result of learning by SL (2) is shown in FIG. 10. FIG. 10 shows that the speeding up effect is more significant as the number of weak classifiers is increased. From the number of weak classifiers J=20, - - - , 50, evaluation speed becomes faster by about 10% of the total number of weak classifiers evaluated. The experiment shows that the suboptimal solution, even though not an optimal solution, may constantly perform faster discriminations than other arrangement orders.

In Experiment 3, experimental results of advantageous effects of ordinal structure learning in which the order of two weak classifiers is exchanged and ordinal structure learning in which the order of three weak classifiers is exchanged (learning by SL 3))

Average numbers of evaluations Γ performed by rapid discrimination apparatus 1 of 20 to 30 weak classifiers, in consideration of calculation amounts, subjected to ordinal structure learning by SL (2) and SL (3) are shown in Table 5 below.

TABLE 5

| J | Γ(J) of SL (2) | Γ(J) of SL (3) |
|---|---|---|
| 20 | 9.595833 | 9.598333 |
| 21 | 11.468333 | 11.470000 |
| 22 | 10.662500 | 10.662500 |
| 23 | 12.314167 | 12.314167 |
| 24 | 12.259167 | 12.257500 |
| 25 | 13.682500 | 13.682500 |
| 26 | 13.446667 | 13.445833 |
| 27 | 14.691667 | 14.735833 |
| 28 | 14.533333 | 14.531667 |
| 29 | 16.003333 | 15.893333 |
| 30 | 15.514167 | 15.512500 |

Table 5 shows that there is not a significant difference between SL (2) and SL (3) with only a difference of 0.01 to 0.1 (Γ=J). The experiment shows that a sufficient speed increase may be obtained by the ordinal structure learning by SL (2).

In view of both the amount of calculations required for ordinal structure learning and reduction in discrimination time of a rapid discrimination apparatus, it may be concluded that it is the best way to determined the arrangement order of weak classifiers by the ordinal structure learning by SL (2).

In the present embodiment, a method of determining the arrangement order of weak classifiers taking, as an example, the case in which weak classifiers $f_j$ take one of two values of $-1$ and 1, as described in the first embodiment. In the case where weak classifiers $f_j$ take one of two appropriate values of real numbers $\alpha_j$ and $\beta_j$, as described in the second embodiment, when Γ is obtained by a weak classifier group arranged in the order of $\hat{k}$ in the evaluated weak classifier quantity obtaining step, the condition 3-1 or 4-1 may be obtained as the condition that the discrimination result determination unit 14a terminates the evaluation of weak classifiers. Alternatively, in determining the arrangement order of weak classifiers, when Γ is obtained by a weak classifier group arranged in the order of $\hat{k}$ in the evaluated weak classifier quantity obtaining step, the condition 3-2 or 4-2 may be obtained as the condition that the evaluation of weak classifiers is terminated.

As described in the third embodiment, the present invention may realize very rapid discrimination by determining the optimal (or suboptimal) arrangement order of weak classifiers and discriminating whether or not a face is included in a discrimination target image data by the rapid discrimination apparatus of first or second embodiment formed of a weak classifier group arranged in the determined order.

In the case where weak classifiers $f_j$ take one of two values of $-1$ and 1, as in the first embodiment, most rapid discrimination may be performed by determining the optimal (or suboptimal) arrangement order of weak classifiers by the method described above in detail and performing discrimination by the rapid discrimination apparatus 1 formed of a weak classifier group arranged in the determined order.

In the mean time, in the case where weak classifiers $f_j$ take one of two appropriate values of real numbers $\alpha_j$ and $\beta_j$, there are two cases in one of which the evaluation of weak classifiers is terminated when the condition 3-1 or 4-1 is satisfied and in the other of which the evaluation of weak classifiers is terminated when the condition 3-2 or 4-2 is satisfied. Consequently, in the case where weak classifiers $f_j$ take one of two appropriate values of real numbers $\alpha_j$ and $\beta_j$, the following four combinations may be possible.

(1) Determining the condition 3-1 or 4-1 as the condition for terminating the evaluation of weak classifiers in order to determine an optimal (or suboptimal) arrangement order and a rapid discrimination apparatus 1a formed of a weak classifier group arranged in the determined optimal (or suboptimal) arrangement order terminates the evaluation of the weak classifiers when the condition 3-1 or 4-1 is satisfied.

(2) Determining the condition 3-1 or 4-1 as the condition for terminating the evaluation of weak classifiers in order to determine an optimal (or suboptimal) arrangement order and a rapid discrimination apparatus 1a formed of a weak classifier group arranged in the determined optimal (or suboptimal) arrangement order terminates the evaluation of the weak classifiers when the condition 3-2 or 4-2 is satisfied.

(3) Determining the condition 3-2 or 4-2 as the condition for terminating the evaluation of weak classifiers in order to determine an optimal (or suboptimal) arrangement order and a rapid discrimination apparatus 1a formed of a weak classifier group arranged in the determined optimal (or suboptimal) arrangement order terminates the evaluation of the weak classifiers when the condition 3-1 or 4-1 is satisfied.

(4) Determining the condition 3-2 or 4-2 as the condition for terminating the evaluation of weak classifiers in order to determine an optimal (or suboptimal) arrangement order and a rapid discrimination apparatus 1a formed of a weak classifier group arranged in the determined optimal (or suboptimal) arrangement order terminates the evaluation of the weak classifiers when the condition 3-2 or 4-2 is satisfied.

It is possible to determine a rapid discrimination apparatus that can perform the discrimination most rapidly from the four combinations described above. The conditions 3-1 and 4-1 are simpler in processing and faster in processing itself in comparison with the conditions 3-2 and 4-2, but it is confirmed by the experiment that the performance difference in the number of evaluations before termination is small. It is preferable that an appropriate combination be determined, as appropriate, by the experimental results or the like.

Figure 11:
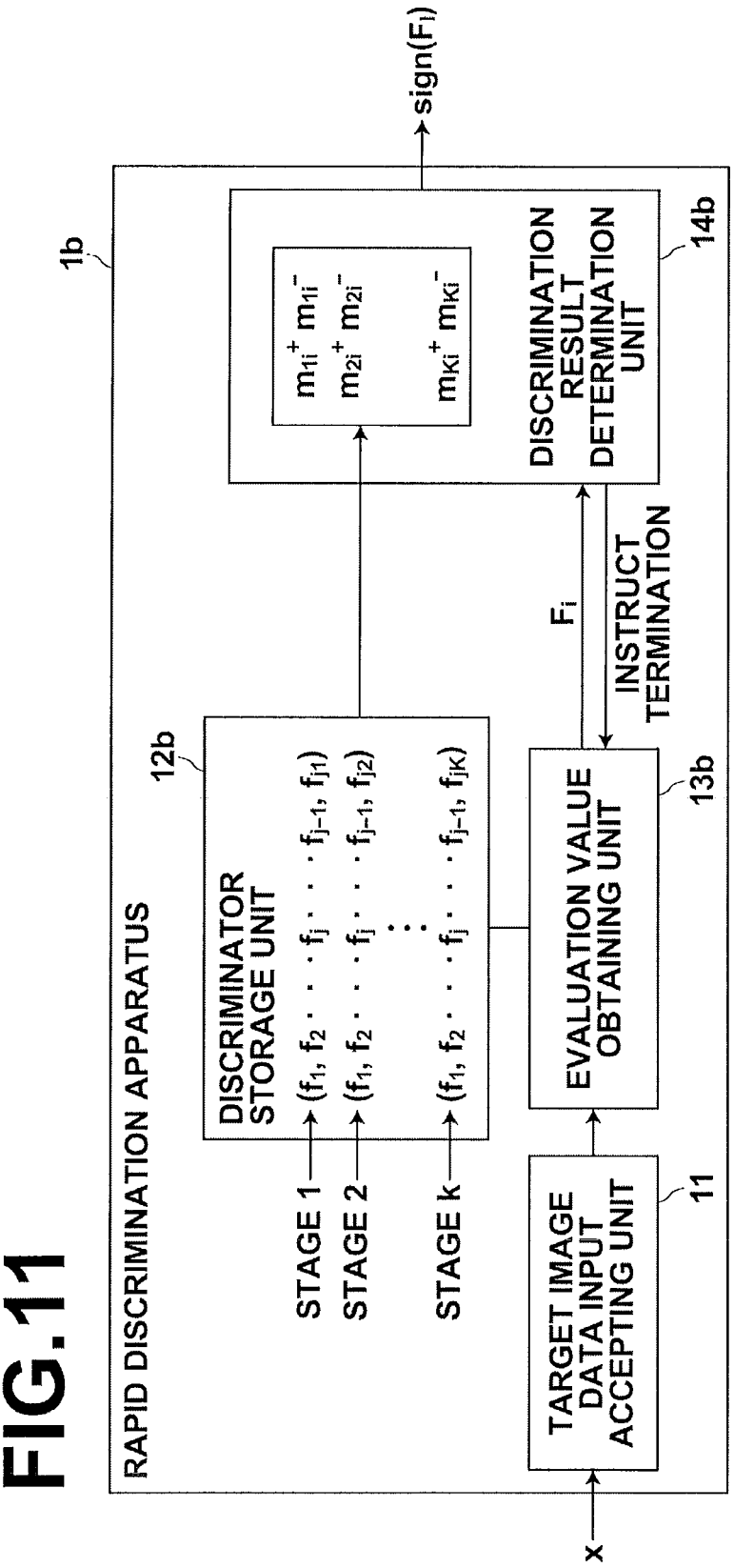
FIG. 11 is a block diagram of a rapid discrimination apparatus with a plurality of stages according to a fourth embodiment, illustrating the configuration thereof.

In a fourth embodiment, a description will be made of a case in which a weak classifier group of a rapid discrimination apparatus is formed in a cascade. FIG. 11 is a block diagram of a rapid discrimination apparatus 1b according to the present embodiment illustrating the configuration thereof. The rapid discrimination apparatus 1b includes the target data input accepting unit 11, a discriminator storage unit 12b, an evaluation value obtaining unit 13b, and a discrimination result determination unit 14b. The rapid discrimination apparatus of the present embodiment differs from the first and second embodiments only in that the weak classifier group is divided into a plurality of stages and formed in a cascade, and identical to the first and second embodiments in other aspects. Therefore, the structure is not elaborated upon further here and only different points will be described here.

The discriminator storage unit 12b has stored therein "J" weak classifiers divided into "K" stages, each having $J_k$ (k=1 to K) weak classifiers arranged in a predetermined order. Now, a discrimination function in the $k^{th}$ stage is defined as $F_k$ which may be represented as follows.

$$F_k(x) = \left(\sum_{j=1}^{J_k} f_{kj}(x)\right) - T \quad (23)$$

where $$f_{kj}(x) = \begin{cases} \alpha_{kj} & \text{if } x \in A_j \\ \beta_{kj} & \text{otherwise} \end{cases}$$

$A_j$: "True" area $T$: threshold value

The final discrimination apparatus "g" at each stage may be represented as follows.

$$g_k := \text{sign}(F_k(x)) \quad (24)$$

Then, evaluation value obtaining unit 13b sequentially calculates overall evaluation values $F_{ki}(x)$ from i=1 to Jk with respect to each stage.

$$F_{ki}(x) = \left(\sum_{j=1}^{i} f_{kj}(x)\right) - T_k \quad (25)$$

where $$f_{kj}(x) = \begin{cases} \alpha_{kj} & \text{if } x \in A_j \\ \beta_{kj} & \text{otherwise} \end{cases}$$

$A_j$: Area where face is present $\alpha_{kj}$, $\beta_{kj}$: real numbers

Next, the discrimination result determination unit 14b obtains a range of values that and subsequent weak classifiers can possibly take with respect to each stage (#13).

$$m_{ki}^+ := \sum_{j=i+1}^{J_k} \max(\alpha_{kj}, \beta_{kj}) \quad (26)$$

-continued $$m_{ki}^- := \sum_{j=i+1}^{J_k} \min(\alpha_{kj}, \beta_{kj})$$

If the overall evaluation value $F_{JK}(x)$ obtained by evaluating the first to $I_K{}^{th}$ weak classifiers satisfies either one of the conditions 7 and 8 given below, the evaluation of the weak classifiers is terminated at the $I_K{}^{th}$ weak classifier in each stage.

Condition 7 (27)

$$F_{Ik}(x) + m_{Ik}^- \geq 0$$

Condition 8

$$F_{Ik}(x) + m_{Ik}^+ \leq 0$$

where $$F_{Ik}(x) = \left(\sum_{j=1}^{Ik} f_{kj}(x)\right) - T_k$$

$$m_{Ik}^+ := \sum_{j=i+1}^{Ik} \max(\alpha_{kj}, \beta_{kj})$$

$$m_{Ik}^- := \sum_{j=i+1}^{Ik} \min(\alpha_{kj}, \beta_{kj})$$

Here, the description has been made of a case in which each weak classifier takes one of two appropriate values of real numbers, but in the case where each weak classifier takes one of the two values of 1 and −1, as in the first embodiment, the evaluation of weak classifiers may be terminated with respect to each stage in the same manner as described above.

Figure 12:
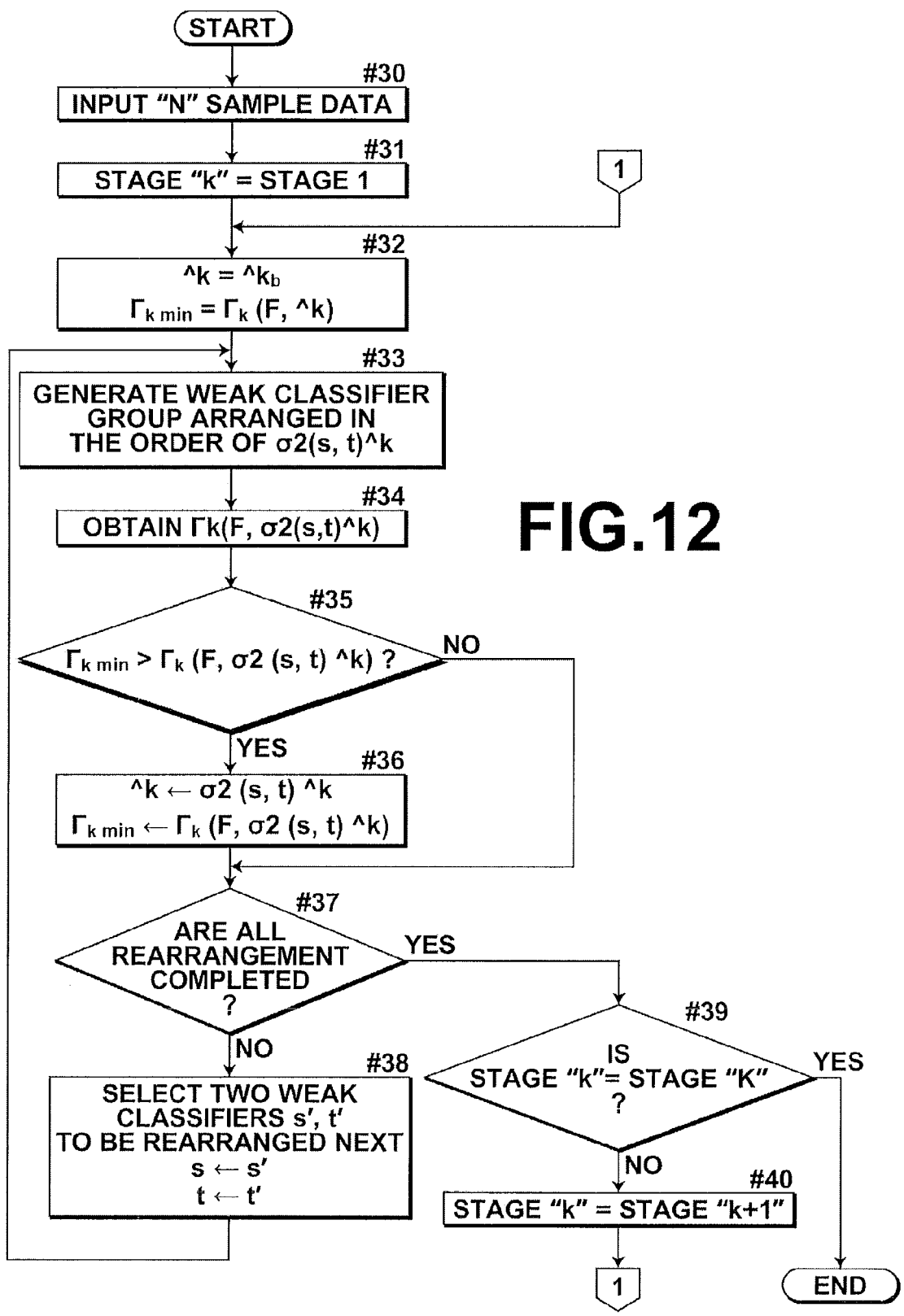
FIG. 12 is a flowchart illustrating a processing flow of ordinal structure learning according to a fifth embodiment.

In a fifth embodiment, ordinal structure learning for obtaining an optimal arrangement order of a plurality of weak classifiers of a rapid discrimination apparatus, in which the weak classifiers are formed in a cascade, will be described. In the cascade type (cascade structure) rapid discrimination apparatus, the weak classifiers are divided into several groups called as stages. In actual detection, evaluation is performed from the first stage and if there is a stage evaluated not to be a face, the image is determined not to be a face, and the evaluation is terminated at that stage, that is, the evaluation does not to proceed to the next stage. Therefore, the image is determined to be a face only each stage is determined to be a face. Here, a description will be made of a case in which ordinal structure learning is performed by taking each stage as one discrimination apparatus obtained by boosting. FIG. 12 is a flowchart illustrating a processing flow of ordinal structure learning of a cascade type rapid discrimination apparatus. The processing flow is substantially identical to that of the ordinal structure learning in the third embodiment, except that the arrangement order is changed with respect to each stage, so that different points are mainly described with reference to FIG. 12.

The change in arrangement order may be conducted for a weak classifier group in which weak classifiers are arranged in a predetermined order by any one of the methods of SL (1), SL (2), and SL (3) with respect to each stage. Here, a description will be made of a case in which the change in arrangement order is conducted by SL (2).

First, N sample data are provided and stored in a storage device (#30). With the stage "k" set as stage 1, the arrangement order of the weak classifier group is searched from stage 1 (#31).

The order of absolute value of coefficient ˆ$k_b$ of weak classifiers $f_j$ selected by the boosting is set as an initial value of the order ˆk of each stage. Further, $\Gamma_k$(F, ˆk) at this time is set as an initial value of $\Gamma_{kmin}$ (#32).

Next, in the weak classifier exchange step, two weak classifiers placed in $s^{th}$ and $t^{th}$ positions in the weak classifier group of the current stage are exchanged (#33). Then, in the evaluated weak classifier quantity obtaining step, each of N sample data is accepted by the target data input accepting unit 11 as the target image data "x" and a quantity $I_k$ of weak classifiers evaluated during a period after the function of the evaluation value obtaining unit 13b is started and before termination of the evaluation is instructed by the discrimination result determination unit 14b is obtained with respect to each sample data in each stage to obtain an average number of evaluations $\Gamma_k$ from the N sample data (#34).

In the arrangement order change step, if the average number of evaluations $\Gamma_k$ after the exchange is smaller than the average number of evaluations $\Gamma_{kmin}$ before the exchange (#35 is YES), the arrangement order of the weak classifier group of the current stage is changed to that after the exchange (#36). On the other hand, if the average number of evaluations $\Gamma_k$ after the exchange is larger than the average number of evaluations $\Gamma_{kmin}$ before the exchange (#35 is NO), the arrangement order of the weak classifier group of the current stage is remained unchanged.

Then, weak classifiers "s'" and "t'" to be exchanged next are selected (#38). In the search step, the weak classifier exchange step, evaluated weak classifier quantity obtaining step, and arrangement order change step are repeated (#37 is NO) until all changes in arrangement order are completed to search for the arrangement order of weak classifiers of current stage that minimizes the average number of evaluations $\Gamma_k$. When all changes in arrangement order are completed (#37 is YES), the processing flow moves to the change in arrangement order in the next stage.

First, a determination is made as to whether or not the current stage "k" is the final stage "K", if the current stage "k" is not the final stage "K" (#39 is NO), the processing flow moves to the next stage "k+1" (#40) and the arrangement order of the weak classifier group of the next stage is searched (#33 to #38).

When the search of the arrangement order of weak classifier group that minimizes the average number of evaluations Γk in each stage is completed, the ordinal structure learning is concluded (#39 is YES).

In Experiment 4, ordinal structure learning was performed on a frontal face detector (rapid discrimination apparatus). Table 6 lists the number of weak classifiers included in each stage.

TABLE 6

| NO. OF STAGES | NO. OF WEAK CLASSIFIERS |
|---|---|
| 0 | 9 |
| 1 | 16 |
| 2 | 27 |
| 3 | 32 |
| 4 | 52 |
| 5 | 53 |
| 6 | 62 |
| 7 | 72 |
| 8 | 83 |
| 9 | 91 |
| 10 | 99 |
| 11 | 115 |
| 12 | 127 |
| 13 | 135 |
| 14 | 136 |
| 15 | 137 |
| 16 | 159 |
| 17 | 155 |
| 18 | 169 |
| 19 | 196 |
| 20 | 197 |
| 21 | 181 |
| 22 | 199 |
| 23 | 211 |
| 24 | 200 |

Figure 13:
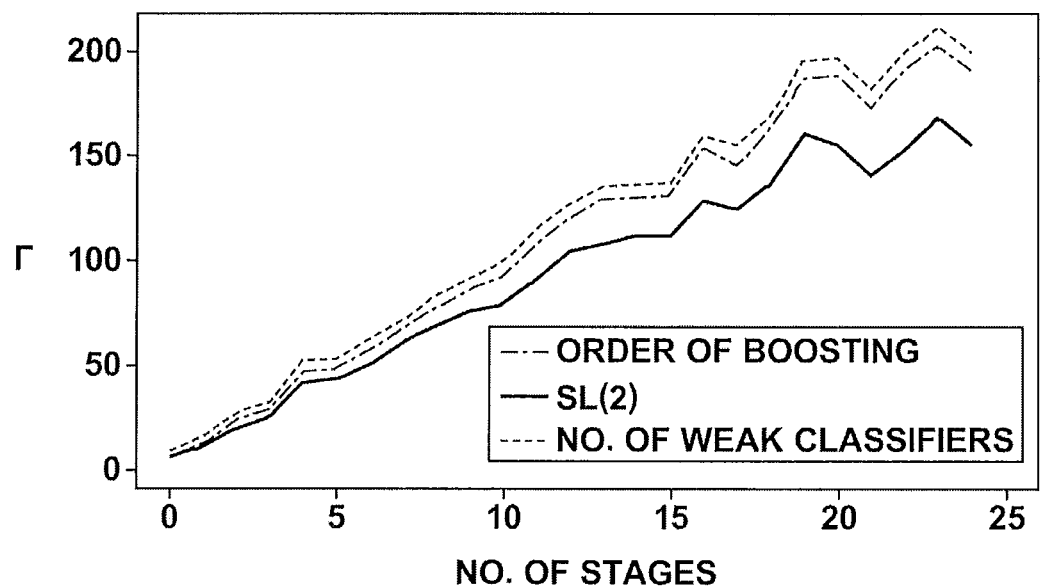
FIG. 13 is a graph illustrating an average number of evaluations in each stage in the order of boosting and an average number of evaluations of each stage after ordinal structure learning by SL (2).
Figure 14:
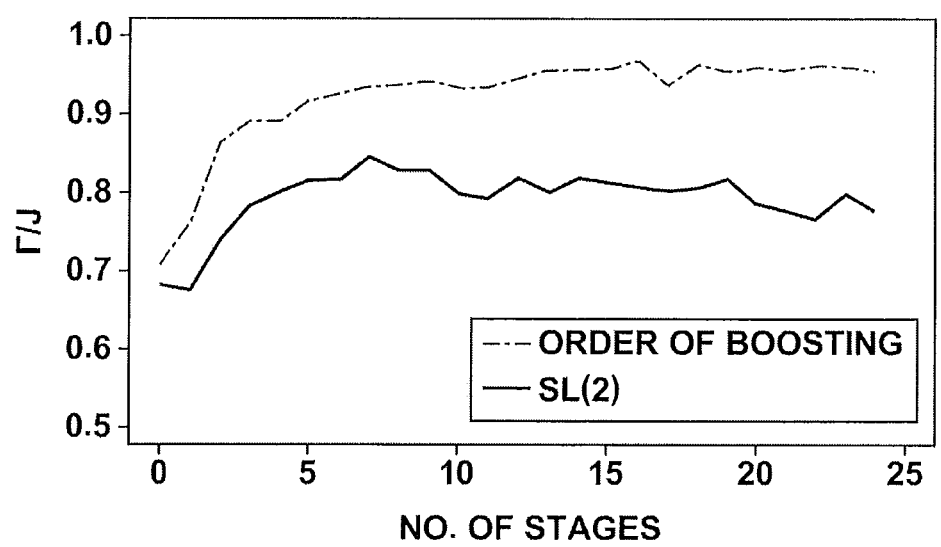
FIG. 14 is a graph illustrating ratios of weak classifiers evaluated in each stage in the order of boosting and after ordinal structure learning by SL (2).

As the total number of weak classifiers is large, SL (2) was employed in the ordinal structure learning. FIG. 13 shows the number of weak classifiers in each stage, average number of evaluations $\Gamma_k$ in each stage in the order of boosting, and average number of evaluations $\Gamma_k$ in each stage after the ordinal structure learning by SL (2). FIG. 14 shows ratios of weak classifiers evaluated in each stage (average number of evaluations $\Gamma_k$/number of weak classifiers "J") in the order of boosting ˆ$k_b$ and after ordinal structure learning by SL (2). Advantageous effects of the ordinal structure learning can be seen in each stage and the average number of evaluations $\Gamma_k$ is smaller, that is, faster in detection in arrangement order obtained by the ordinal structure learning than in the order of boosting ˆ$k_b$ in any stage. Further, it can be seen that the latter the stage, the greater the effects of the ordinal structure learning with a maximum increase in the evaluation speed of about 15% in terms of average number of evaluations.

Figure 15:
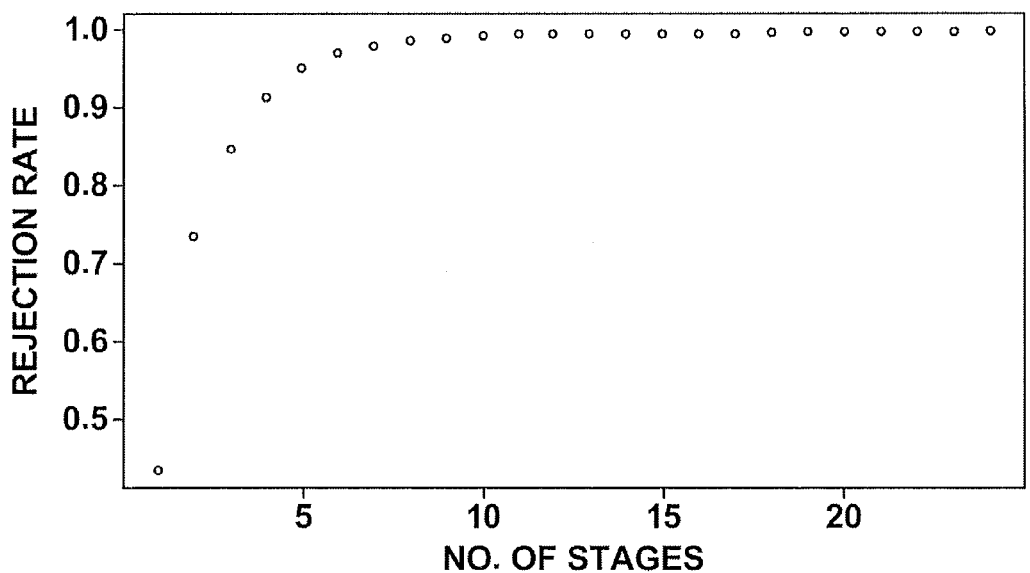
FIG. 15 is a graph illustrating a rejection rate, in each stage, of a search window entered into a first stage.

Next, when a face is searched for in target image data by setting a face detection range (search window) in the target image data at the time of face detection and scanning the entire target image data while determining whether or not a face is present in the search window, a rejection rate (rate that the search window is determined not to include a face and the search window is rejected) in each stage will be described. In a cascade type classifier, evaluation is sequentially performed from the first stage and if there is a stage evaluated not to be a face, the search window is rejected. A rejection rate representing what degree the search window is rejected in each stage is shown in FIG. 15. FIG. 15 shows that 90% of the set search window is rejected by the stage 5 or 6. That is, it indicates that many search windows are rejected in the first half of the stages and a detailed examination as to whether or not a search window includes a face is performed in the latter half of the stages.

Figure 16:
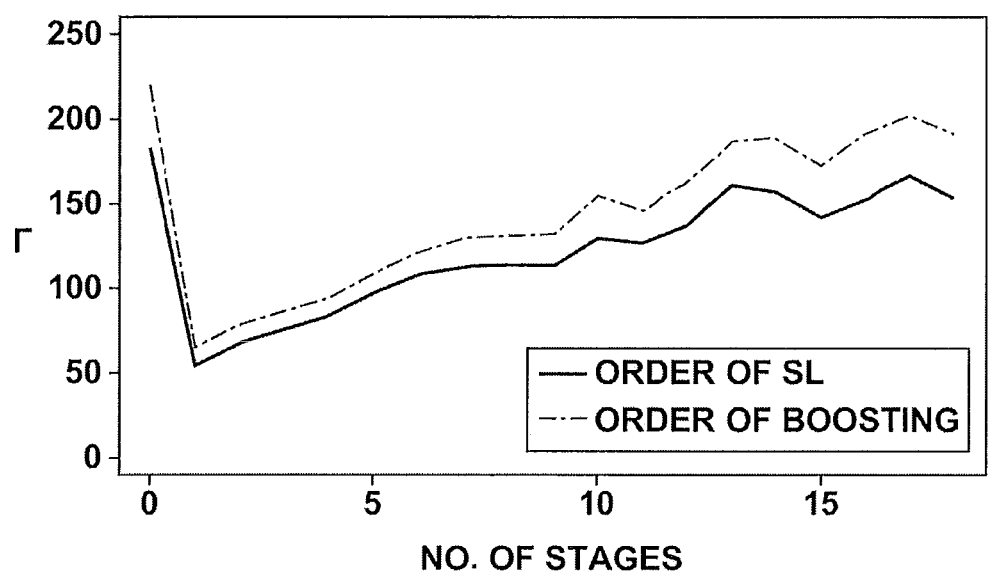
FIG. 16 is a graph illustrating an average number of evaluations of combined front face detectors.

Next, the cascade structure frontal image detector and advantageous effects of the ordinal structure learning for increasing detection speed will be discussed. Cascaded stages from stage 0 to stage 6 shown in Table 6 are integrated into stage 0 and stages 7 to 24 remain unchanged but renumbered as stages 1 to 18. The ordinal structure learning was performed on each stage and the average number of evaluations $\Gamma_k$ is shown in FIG. 16. Referring to stage 0, the average number of evaluations $\Gamma_0$ is about 180 when the ordinal structure learning is performed but the difference is only about 40 in comparison with the case in which the ordinal structure learning is not performed. About 40% of search windows are rejected in stage 0 which was constituted by 9 weak classifiers before being integrated. Thus, from the view point of increasing the detection speed, it is known that the cascade structure may provide faster detection speed than that of the face detector, in which a plurality of stages is integrated, on which the ordinal structure learning is performed. From the discussion above, a conclusion is drawn that a rapid discrimination apparatus having a cascade structure with ordinal structure learning being performed on each stage may achieve the most rapid discrimination.

In the ordinal structure learning in the third and fifth embodiments, an average number of discriminators evaluated before termination of the evaluation is obtained using N sample data and the arrangement order of the discriminator group that may terminate the evaluation of discriminators at the earliest stage is searched for. But the arrangement order of the discriminator group that may terminate the evaluation of discriminators at the earliest stage may be searched for from the representative value, such as mode value, median value, or the like.

Next, in a sixth embodiment, learning data used for boosting learning and ordinal structure learning, and evaluation data used for performance evaluations will be described. Any of the rapid discrimination apparatuses described in the first, second, and fourth embodiment is used as a rapid discrimination apparatus of the present embodiment. The method of speeding up the rapid discrimination apparatus described in the third and fifth embodiment is employed in the ordinal structure learning. The rapid discrimination apparatus of the present embodiment has the same structure as that of any of the embodiments described above and each step for speeding up the rapid discrimination apparatus is performed in the same order as that described above. Therefore, in the present embodiment, the learning data and evaluation data will be described in detail.

Generally, it is well known that a labeled learning data set or an unlabeled learning data set is used as a learning data set. For example, in the case of learning data used for face detection, feature values "x" may be automatically collected by machines in large quantity while a label "y" (face present: 1, face not present: −1) of each learning data should be manually attached. Consequently, it would be costly to increase the size of labeled learning data set $D_L$. On the other hand, learning data of only feature values (x) (unlabeled learning data) may be collected easily in large quantity.

In the mean time, it is presumed that an evaluation data set $D_T$, which is close to the target image data on which face detection is actually performed by a digital camera, differs in feature distribution from a labeled learning data set $D_L$ used for learning. The reason is that it would be natural, in general, to prepare learning data that include many faces when face detection learning is performed while the target image data actually obtained by a digital camera do not always include so many faces.

Consequently, three different types of learning data will be described.
(a) Supervised Learning Data Set
  Only labeled learning data $D_L$ are given. This data set has been used widely from the past and is used in boosting learning of the present invention to select weak classifiers but costly for labeling for increased data size as described above.
(b) Semi-Supervised Learning Data Set
  Labeled learning data $D_L$ and unlabeled data $D_U$ are given, but the $D_U$ and $D_L$ follow the same distribution.
(c) Covariate Shift Learning Data Set
  Labeled learning data $D_L$ and unlabeled data $D_U$ are given, but the $D_U$ and $D_L$ follow different distributions.

As the ordinal structure learning requires a large amount of data, use of the semi-supervised learning data set which includes the labeled learning data $D_L$ and unlabeled data $D_U$ or covariate shift learning data set may be considered.

Now, discrimination speeds of the conventional discrimination apparatus and rapid discrimination apparatus described in each embodiment above will be discussed. First, discrimination apparatuses are classified into the following four types:
(i) Conventional discrimination apparatus proposed by Viola and Jones (e.g., Document 3: P. Viola and M. J. Jones, "Rapid Object Detection using a Boosted Cascade of Simple Feature", IEEE Conf. on Computer Vision and Pattern Recognition, 2001.V);
(ii) Rapid discrimination apparatus (of first, second, or fourth embodiment) in which weak classifiers are arranged in the order of absolute value of coefficient and evaluation is terminated at a weak classifier quantity γ (I or $I_k$ in the first, second, or fourth embodiment);
(iii) Rapid discrimination apparatus (of first, second, or fourth embodiment) in which weak classifiers are arranged in the order of boosting and evaluation is terminated at a weak classifier quantity γ; and
(iv) Rapid discrimination apparatus (increased in speed by the method of the third or fifth embodiment) in which ordinal structure learning is further performed with respect to the arrangement order of weak classifiers.

The rapid discrimination apparatus of (ii), (iii), or (iv) above may always provide a discrimination speed which is equal to or greater than that of the conventional discrimination apparatus of (i) above under any circumstances. It appears that the rapid discrimination apparatus of (iv) may provide a greatest discrimination speed among all of the apparatuses, but the apparatus of (ii) or (iii) may increase the discrimination speed to a certain degree without the ordinal structure learning, provided that the distribution of the learning data is identical to that of the evaluation data.

In face detection, it is inevitable that the learning data and evaluation data follow different distributions (Document 3). Even in a conventional discrimination apparatus classified in (i) above which is structured such that data not representing a face is rejected in an early stage by providing a few weak classifiers in early stages for discriminating data unlikely to represent a face, that is, structured in cascade, the cascade structure is determined on the assumption that the learning data differs from the evaluation data in distribution. This is heuristic based on the rule of thumb.

In the order of absolute value of coefficient in (ii) and (iii) above, if weak classifiers are diverse enough, the weak classifier quantity γ when discrimination is terminated by the rapid discrimination apparatus halfway through all of the weak classifiers depends on the distribution P(x) of supervised learning data set (labeled learning data set) "x", although the discrimination function of AdaBoost does not. Consequently, the order of absolute value of coefficient is not the optimal order of arrangement. Likewise, the reason why the order of AdaBoost is not the optimal order of arrangement is that the AdaBoost selects a weak classifier that improves the supervised learning data set the most.

In contrast, if the ordinal structure learning in (iv) above can be performed using unlabeled learning data that follows the same distribution as that of the evaluation data (data close to target image data on which face discrimination is actually performed in a digital camera or the like), a performance considerably exceeding those of (i) to (iii) may be expected.

First, a labeled learning data set $D_L:=\{(x_i, y_i)|i=1, 2, \text{---}, n\}$ with a distribution $P_1(x)$ and, as unlabeled learning data sets independent of the labeled learning data set $D_L$, $D^1_U:=\{x_1, x_2, \text{---}, x_{nu}\}$ that follows the distribution $P_1(x)$ and $D^2_U:=\{x_1, x_2, \text{---}, x_{nu}\}$ that follows a distribution $P_2(x)$ are provided. In addition, as evaluation data sets independent of $D_L$, $D^1_U$, and $D^2_U$, $D^1_T:=\{x_1, X_2, ---, x_{nt}\}$ that follows the distribution $P_1(x)$ and $D^2_T:=\{x_1, X_2, ---, x_{nt}\}$ that follows the distribution $P_2(X)$ are provided. The distributions $P_1(x)$ and $P_2(x)$ represent different distributions, in which $P_1(x)$ represents a distribution substantially corresponding to that of the data used for boosting learning and $P_2(x)$ represents a distribution substantially corresponding to that of target image data on which face discrimination is actually performed. In this experiment, n=300, nu=300, and nt=1200 were used.

First, the boosting learning is performed using the data $D_L$. A discrimination function obtained by the learning is assumed to be as follows (here, description will be made of a case in which the discrimination function as that in the first embodiment is used).

$$F(x) = \sum_{j=1}^{J} \alpha_j f_j(x) \quad (1)$$

The same discrimination function will be used in all of the subsequent experiments. With respect to the discrimination function F (x), four types of experiments shown in the table given below (Experiment 2 in the table is identical to the Experiment 2 in the third embodiment) were conducted. The purpose of these experiments will be described herein below. The performance evaluation is based on $\Gamma(F)/J$ calculated using the evaluation data set $D^1_T$ or $D^2_T$. $D^x_L$ represents a feature set of only the $D_L$. Hereinafter, data used for boosting learning and the data used for ordinal structure learning will be distinguished by referring to the former as learning data set and the latter as sample data set.

Figure 18:
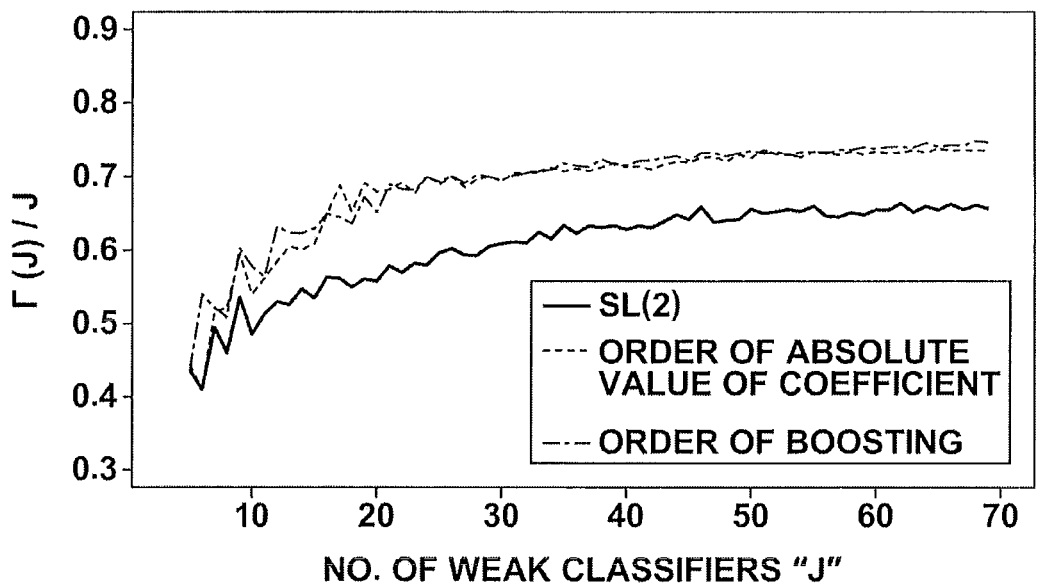
FIG. 18 is a graph showing a performance evaluation when ordinal structure leaning in Experiment 6 is performed.

In Experiment 6, a sample data set $D^x_L$ identical to the learning data set and a sample data set $D^1_U$ independent of the learning data set, although having the same distribution as that of the learning data set, were used for the ordinal structure learning. For the evaluation, the evaluation data set $D^1_T$ independent of the learning data set, although having the same distribution as that of the learning data set. Results of Experiment 6 are shown in FIG. 18. The ordinal structure learning allows stable increase in the speed. But, as in Experiment 2, the degree of improvement does not increase even when the number of weak classifiers is increased, since the learning data set and sample data set follow the same distribution and the evaluation data set $D^1_T$ with the same distribution as that of the learning and sample data sets is used.

Figure 19:
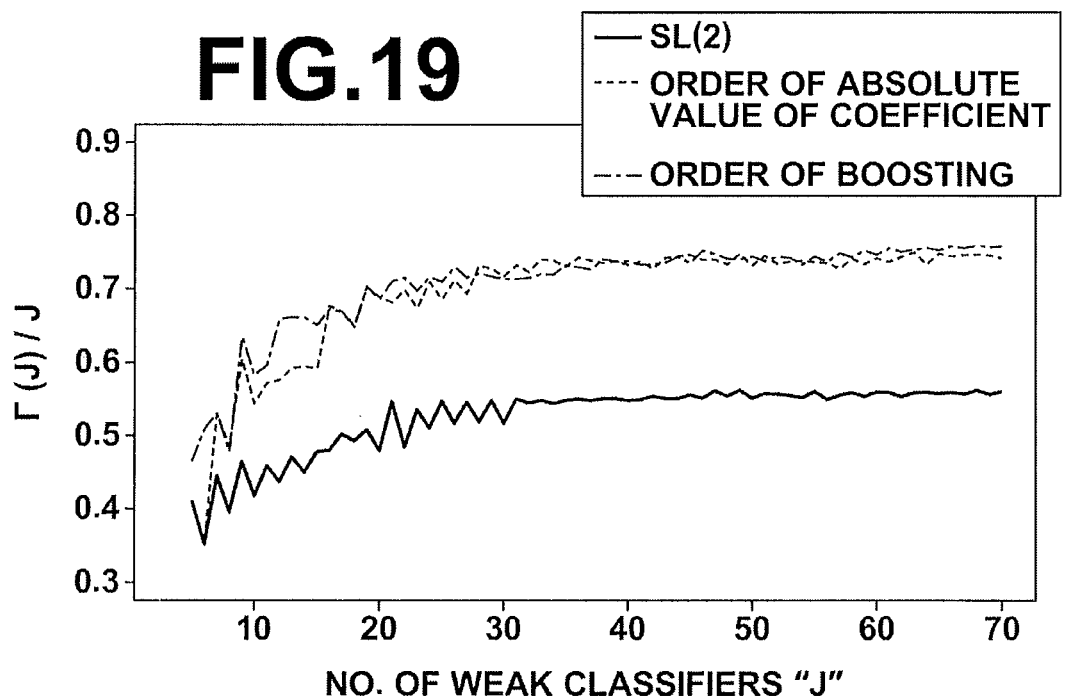
FIG. 19 is a graph showing a performance evaluation when ordinal structure leaning in Experiment 7 is performed.

In Experiment 7, the sample data set $D^2_U$ with a different distribution from that of the learning data set was used for the ordinal structure learning and the evaluation data set $D^2_T$ with a distribution different from that of the learning data set was used for the evaluation. Results of Experiment 7 are shown in FIG. 19. FIG. 19 shows that the increase in speed due to the ordinal structure learning is significant. The reason is that the prediction of the priority order of the discrimination apparatus considered important in the order of absolute value of coefficient or in the order of boosting will prove wrong under covariate shift. It may be said that, however, such a large difference will not occur, if the learning algorithm of boosting is extended to the covariate shift.

The boosting learning may be performed only with labeled learning data. It will be costly, therefore, to increase the size of the learning data set used for the boosting learning. In the ordinal structure learning, an ordinal structure (focusing only on the order of weak classifiers) is learned and the labels of

TABLE 7

| | ORDINAL STRUCTURE LEARNING | SETTING | SAMPLE DATA OF ORDINAL STRUCTURE LEARNING | EVALUATION DATA |
|---|---|---|---|---|
| EXPERIMENT 2 | SL (2) | SUPERVISED LEARNING | $D^x_L$ | $D^1_T$ |
| EXPERIMENT 5 | SL (2) | SUPERVISED LEARNING | $D^x_L$ | $D^2_T$ |
| EXPERIMENT 6 | SL (2) | SEMI-SUPERVISED LEARNING | $D^x_L \cup D^1_U$ | $D^1_T$ |
| EXPERIMENT 7 | SL (2) | COVARIATE SHIFT | $D^2_U$ | $D^2_T$ |

In each of the experiments listed in the table above, SL (2) was used for the ordinal structure learning.

In Experiment 2, a data set identical to the learning data set was used, as the sample data set $D^x_L$, for the ordinal structure learning. Results of Experiment 2 are shown in FIG. 10. FIG. 10 shows that the speeding up effect is more significant as the number of weak classifiers is increased. From the number of weak classifiers J=20, - - -, 50, evaluation speed becomes faster by about 10% of the total number of weak classifiers evaluated.

Figure 17:
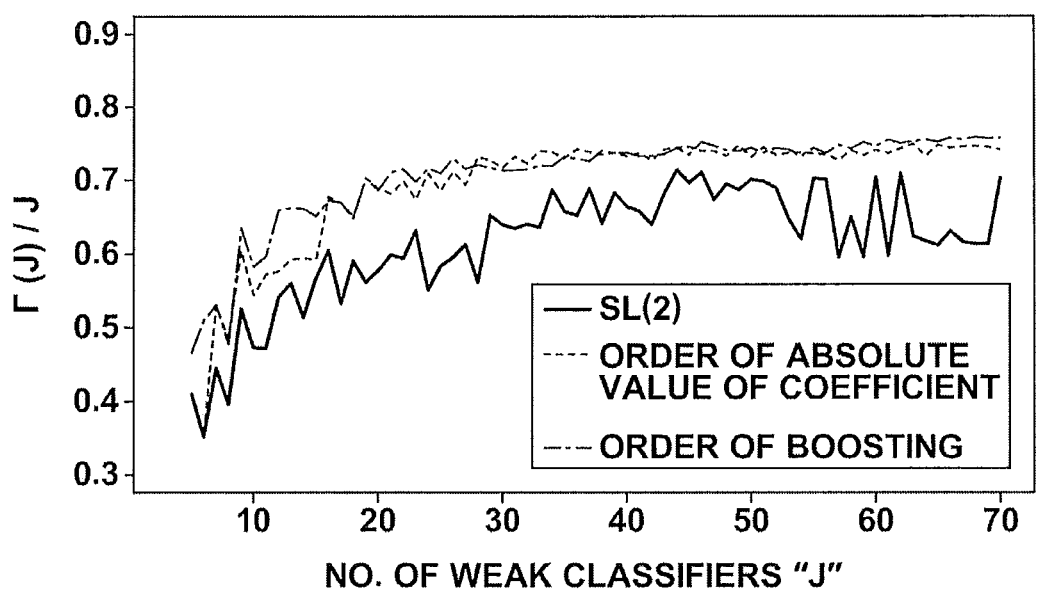
FIG. 17 is a graph illustrating a performance evaluation when ordinal structure leaning in Experiment 5 is performed.

In Experiment 5, a data set identical to the learning data set was used, as the sample data set $D^x_L$, for the ordinal structure learning and the evaluation data set $D^2_T$ with a distribution pattern different from that of the learning data set was used for the evaluation. Results of Experiment 5 are shown in FIG. 17. In each of Experiments 2 and 5, the order of boosting shows a behavior similar to that of the order of absolute value of coefficient. Further, it is known that the results of both orders between Experiments 2 and 5 do not change greatly. In contrast, the result of ordinal structure learning in Experiment 5 is unstable in comparison with Experiment 2 as the number of weak classifiers is increased. The reason for this is thought to be the difference in distribution of data between the time of learning and the time of evaluation.

the learning data are not essential and the learning for increasing the speed may be performed with either of the labeled and unlabeled learning data. Consequently, it is relatively easy to increase the size of the learning data set used for ordinal structure learning.

It may be thought that the target image data on which face detection is actually performed by a digital camera differ from the labeled learning data in feature distribution. Consequently, the sample data set different in distribution from the learning data set for boosting, that is, the sample data set with a distribution close to that of the target image data on which discrimination is actually performed is used to rearrange the weak classifiers in the order which takes account the difference, whereby the speed of the rapid discrimination apparatus may be increased. More specifically, as described in the embodiment, by applying unlabeled semi-supervised learning data set or sample data set having covariant shift distribution characteristics to the ordinal structure learning, the weak classifiers of the rapid discrimination apparatus may be rearranged so that the apparatus becomes faster than in the case where the weak classifiers are arranged in the order of absolute value of coefficient or in the order of AdaBoost.

In the present embodiment, the description has been made of a case in which each weak classifier takes one of two values of 1 and −1, but also in the case where each weak classifier takes one of two values of real numbers, as in the second embodiment, the weak classifiers of the rapid discrimination apparatus may be rearranged so that the speed of the apparatus is further increased by applying unlabeled semi-supervised learning data set or sample data set having covariant shift distribution characteristics to the ordinal structure learning.

So far, face detection has been described in detail, but the object may be a certain region of appearance of a human body, such as a human hand or an area that includes at least a certain region within a living body instead of the appearance of a human body. In the case where the target image data represent an image obtained by an endoscope system, microscope, or the like, the object may be a tumor tissue, cell, protein, macromolecule, such as DNA or RNA, and low molecule in a living body. Further, the object may be a compound, such as a medicine or the like, protein, and the like imaged by a microscope other than a living body. Still further, the object may be an image of currency, card, such as a cash card, automobile, or car registration plate represented by target image data obtained by an imaging device, such as a digital still camera or the like. In the case where the target image data represent an image obtained by a scanning device, such as a copy machine, the object may be a character, drawing, table, or photograph of a document. Further, the object may be a statistically biased group when image data are statistically analyzed and, for example, it may be a texture.

The description has been made of a case in which the target data are image data, but the target data may be sound data, character data, biometric data, and natural/physical data. More specifically, the rapid discrimination apparatus described above may be used when searching for a voice, sound of living body, voice of creature (animal, bird, and insect), sound of musical instrument, sound of vehicle, and the like from sound data. The voice data and character data may include language data of various languages including Japanese, English, and the like. With respect to language data, the rapid discrimination apparatus described above may be used for discriminating a local dialect, intended use of the data (formal data, such as news or informal data), time (Heian Period, Edo Period, present day) when the language was written (or spoken), generation (high school student or senior person) of the writer or speaker, and the like. The biometric data may be measurement data of heartbeat, pulsation, blood pressure, respiration, waveform, period and amplitude of perspiration, and the like. The natural/physical data may be measurement data of weather, climate, waveform, period and amplitude of earthquake, and the like.

The description has been made of a case in which the discriminator is a weak classifier, but the discriminator group may include a weak classifier having a low misclassification rate.

The discrimination has been made by taking the boosting, as example, but the discriminator group may be a group generated by bagging.

What is claimed is:

1. A rapid discrimination apparatus for obtaining a result of discrimination as to whether or not a predetermined object is included in target data of discrimination, the apparatus comprising:

a target data input accepting unit that accepts input of the target data "x";

a discriminator group constituted by a plurality of discriminators $f_j$ (j=1 to J) arranged in a predetermined order and used for evaluating whether or not the object is included in the target data "x";

an evaluation value obtaining unit that obtains an evaluation value $f_j(x)$ of the target data "x" evaluated using each of the plurality of discriminators successively from a first discriminator and sequentially obtains an overall evaluation value $F_i(x)$ derived from evaluation values $f_j(x)$ (j=1 to i) of first to $i^{th}$ discriminators from i=1 to J; and a discrimination result determination unit that instructs the evaluation value obtaining unit to terminate the evaluation of $I+1^{th}$ and subsequent discriminators if it is determined, based on a range of evaluation values that each of the $I+1^{th}$ and subsequent discriminators can possibly take, that a discrimination result represented by an overall evaluation value $F_j(x)$ obtained by evaluating the first to i=$I^{th}$ discriminators (I<J) by the evaluation value obtaining unit remains unchanged even if evaluation values of the $i+1^{th}$ and subsequent discriminators are added to the overall evaluation value $F_j(x)$ obtained by evaluating the first to $I^{th}$ discriminators, and determines the discrimination result according to the overall evaluation value $F_j(x)$ obtained by evaluating the first to $I^{th}$ discriminators as a final result.

2. The rapid discrimination apparatus of claim 1, wherein:

the discriminator group is a group that stores, as well as the plurality of discriminators $f_j$, a weight $\alpha_j$ of each discriminator; and the evaluation value obtaining unit is a unit that sequentially obtains an overall evaluation value $F_i(x)$ given blow which is a linear combination of an evaluation value $f_j(x)$ of each of the first to $i^{th}$ discriminators and the weight $\alpha_j$ of each discriminator from i=1 to J $$F_i(x) = \sum_{j=1}^{i} \alpha_j f_j(x)$$

where $$f_j(x) = \begin{cases} 1 & \text{if } x \in A_j \\ -1 & \text{otherwise} \end{cases}$$

$A_j$: "True" area.

3. The rapid discrimination apparatus of claim 2, wherein the discrimination result determination unit is a unit that instructs the evaluation value obtaining unit to terminate the evaluation of the $I+1^{th}$ and subsequent discriminators if the overall evaluation value $F_j(x)$ obtained by evaluating the first to i=$I^{th}$ discriminators by the evaluation value obtaining unit satisfies condition 1 given below and determines the discrimination result according to the overall evaluation value $F_j(x)$ obtained by evaluating the first to $I^{th}$ discriminators as a final result Condition 1

$$F_I(x) = \left| \sum_{j=1}^{I} \alpha_j f_j(x) \right| > \sum_{j=i+1}^{J} \alpha_j.$$

4. The rapid discrimination apparatus of claim 2, wherein the discrimination result determination unit is a unit that instructs the evaluation value obtaining unit to terminate the evaluation of the $I+1^{th}$ and subsequent discriminators if the overall evaluation value $F_j(x)$ obtained by evaluating the first to i=$I^{th}$ discriminators by the evaluation value obtaining unit satisfies condition 2 given below and determines the discrimination result according to the overall evaluation value $F_I(x)$ obtained by evaluating the first to $I^{th}$ discriminators as a final result Condition 2

$$F_I(x) = \left|\sum_{j=1}^{I} \alpha_j f_j(x)\right| > b \times \sum_{j=I+1}^{J} \alpha_j$$

where $0.0 < b < 1.0$.

5. The rapid discrimination apparatus of claim 1, wherein the evaluation value obtaining unit is a unit that sequentially obtains an overall evaluation value $F_i(x)$ given blow which is a linear combination of the evaluation values $f_j(x)$ of first to $i^{th}$ discriminators from i=1 to J $$F_i(x) = \left(\sum_{j=1}^{i} f_j(x)\right) - T$$

where $$f_j(x) = \begin{cases} \alpha_j & \text{if } x \in A_j \\ \beta_j & \text{otherwise} \end{cases}$$

$A_j$: "True" area $T$: threshold value $\alpha_j, \beta_j$: real numbers.

6. The rapid discrimination apparatus of claim 5, wherein the discrimination result determination unit is a unit that instructs the evaluation value obtaining unit to terminate the evaluation of the $I+1^{th}$ and subsequent discriminators if the overall evaluation value $F_I(x)$ obtained by evaluating the first to i=$I^{th}$ discriminators by the evaluation value obtaining unit satisfies condition 3-1 or 4-1 given below and determines the discrimination result according to the overall evaluation value $F_I(x)$ obtained by evaluating the first to $I^{th}$ discriminators as a final result Condition 3-1

$F_I(x) + m_I^- \geq 0$

Condition 4-1

$F_I(x) + m_I^+ \leq 0$ where $$F_I(x) = \left(\sum_{j=1}^{I} f_j(x)\right) - T$$

$$m_I^+ := \sum_{j=I+1}^{J} \max(\alpha_j, \beta_j)$$

$$m_I^- := \sum_{j=I+1}^{J} \min(\alpha_j, \beta_j).$$

7. The rapid discrimination apparatus of claim 5, wherein the discrimination result determination unit is a unit that instructs the evaluation value obtaining unit to terminate the evaluation of the $I+1^{th}$ and subsequent discriminators if the overall evaluation value $F_I(x)$ obtained by evaluating the first to i=$I^{th}$ discriminators by the evaluation value obtaining unit satisfies condition 5-1 or 6-1 given below and determines the discrimination result according to the overall evaluation value $F_I(x)$ obtained by evaluating the first to $I^{th}$ discriminators as a final result Condition 5-1

$F_I(x) + b \times m_I^- \geq 0$

Condition 6-1

$F_I(x) + b \times m_I^+ \leq 0$ where $0.0 < b < 1.0$ $$F_I(x) = \left(\sum_{j=1}^{I} f_j(x)\right) - T$$

$$m_I^+ := \sum_{j=I+1}^{J} \max(\alpha_j, \beta_j)$$

$$m_I^- := \sum_{j=I+1}^{J} \min(\alpha_j, \beta_j).$$

8. The rapid discrimination apparatus of claim 5, wherein the discrimination result determination unit is a unit that instructs the evaluation value obtaining unit to terminate the evaluation of the $I+1^{th}$ and subsequent discriminators if the overall evaluation value $F_I(x)$ obtained by evaluating the first to i=$I^{th}$ discriminators by the evaluation value obtaining unit satisfies condition 3-2 or 4-2 given below and determines the discrimination result according to the overall evaluation value $F_I(x)$ obtained by evaluating the first to $I^{th}$ discriminators as a final result Condition 3-2

$F_I(x) \geq 0$ and $F_I(x) + m_I^- \geq 0$

Condition 4-2

$F_I(x) \leq 0$ and $F_I(x) + m_I^+ \leq 0$ where $$F_I(x) = \left(\sum_{j=1}^{I} f_j(x)\right) - T$$

$$m_I^+ := \sum_{j=I+1}^{J} \max(\alpha_j, \beta_j)$$

$$m_I^- := \sum_{j=I+1}^{J} \min(\alpha_j, \beta_j).$$

9. The rapid discrimination apparatus of claim 5, wherein the discrimination result determination unit is a unit that instructs the evaluation value obtaining unit to terminate the evaluation of the I+1$^{th}$ and subsequent discriminators if the overall evaluation value $F_I(x)$ obtained by evaluating the first to i=I$^{th}$ discriminators by the evaluation value obtaining unit satisfies condition 5-2 or 6-2 given below and determines the discrimination result according to the overall evaluation value $F_I(x)$ obtained by evaluating the first to I$^{th}$ discriminators as a final result Condition 5-2

$F_I(x) \geq 0$ and $F_I(x) + b \times m_I^- \geq 0$

Condition 6-2

$F_I(x) \leq 0$ and $F_I(x) + b \times m_I^+ \leq 0$ where $0.0 < b < 1.0$ $$F_I(x) = \left( \sum_{j=1}^{I} f_j(x) \right) - T$$

$$m_I^+ := \sum_{j=I+1}^{J} \max(\alpha_j, \beta_j)$$

$$m_I^- := \sum_{j=I+1}^{J} \min(\alpha_j, \beta_j).$$

10. The rapid discrimination apparatus of claim 2, wherein the discrimination result is determined according to a sign of the overall evaluation value $F_i(x)$.

11. The rapid discrimination apparatus of claim 1, wherein:
the discriminator group is divided into "K" stages and each stage includes a discriminator group constituted by $J_k$ (k=1 to K) discriminators arranged in a predetermined order;
the evaluation value obtaining unit is a unit that sequentially obtains an overall evaluation value $F_i(x)$ from i=1 to $J_k$ with respect to each stage;
the discrimination result determination unit is a unit that instructs the evaluation value obtaining unit to terminate the evaluation of $I_k+1^{th}$ and subsequent discriminators in each stage if it is determined, based on a range of evaluation values that each of the $I_k+1^{th}$ and subsequent discriminators included in each stage can possibly take, that a discrimination result represented by an overall evaluation value $F_{kI}(x)$ obtained by evaluating the first to $I_k^{th}$ discriminators ($I_k<J_k$) of each stage by the evaluation value obtaining unit remains unchanged even if evaluation values of the $I_k+1^{th}$ and subsequent discriminators are added to the overall evaluation value $F_{kI}(x)$ obtained by evaluating the first to $I_k^{th}$ discriminators, and determines the discrimination result according to the overall evaluation value $F_{kI}(x)$ obtained by evaluating the first to $I_k^{th}$ discriminators as a final result of each stage.

12. A method of speeding up the rapid discrimination apparatus of claim 1, comprising:
a sample data storage step wherein "N" sample data are stored;
a discriminator exchange step wherein two or more discriminators in the discriminator group constituted by a plurality of discriminators arranged in a predetermined order are exchanged to rearrange the order;
an evaluated discriminator count obtaining step wherein, in each of the states of the discriminator group before and after the exchange of the discriminators in the discriminator exchange step, each of the "N" sample data is accepted by the target data input accepting unit as the target data "x", a discriminator count "I" evaluated during a period after the function of the evaluation value obtaining unit is started and before termination of the evaluation of the discriminators is instructed by the discrimination result determination unit is obtained with respect to each sample data, and a representative value of the evaluated discriminator counts of the "N" sample data is obtained;
a rearrangement step wherein if the representative value of the discriminator count evaluated after the exchange is smaller than the representative value of the discriminator count evaluated before the exchange, the arrangement order of the discriminator group is changed to the arrangement order after the exchange and the changed arrangement order is stored in the discriminator group, while if the representative value of the discriminator count evaluated after the exchange is greater than the representative value of the discriminator count evaluated before the exchange, the arrangement order of the discriminator group is remained unchanged; and
a search step wherein the discriminator exchange step, evaluated discriminator count obtaining step, and rearrangement step are repeated to search for an arrangement order of the discriminator group that minimizes the representative value of the evaluated discriminator counts.

13. A method of speeding up the rapid discrimination apparatus of claim 11, comprising:
a sample data storage step wherein "N" sample data are stored;
a discriminator exchange step wherein two or more discriminators in the discriminator group constituted by a plurality of discriminators arranged in a predetermined order are exchanged to rearrange the order with respect to each stage;
an evaluated discriminator count obtaining step wherein, in each of the states of the discriminator group before and after the exchange of the discriminators in the discriminator exchange step, each of the "N" sample data is accepted by the target data input accepting unit as the target data "x", a discriminator count "$I_k$" evaluated during a period after the function of the evaluation value obtaining unit is started and before termination of the evaluation of the discriminators is instructed by the discrimination result determination unit is obtained with respect to each sample data in each stage, and a representative value of the evaluated discriminator counts of the "N" sample data is obtained with respect to each stage;
a rearrangement step wherein if the representative value of the discriminator count evaluated after the exchange is smaller than the representative value of the discriminator count evaluated before the exchange, the arrangement order of the discriminator group is changed to the arrangement order after the exchange in each stage and the changed arrangement order is stored in the discriminator group, while if the representative value of the discriminator count evaluated after the exchange is greater than the representative value of the discriminator count evaluated before the exchange, the arrangement order of the discriminator group is remained unchanged; and a search step wherein the discriminator exchange step, evaluated discriminator count obtaining step, and rearrangement step are repeated to search for an arrangement order of the discriminator group that minimizes the representative value of the evaluated discriminator counts in each stage.

14. The method of claim 12, wherein:
the discriminator exchange step is a step wherein any two discriminators in the discriminator group constituted by a plurality of discriminators arranged in a predetermined order are exchanged; and
the search step is a step wherein the evaluated discriminator count obtaining step and rearrangement step are repeated with respect to each combination of any two discriminators exchanged in the discriminator exchange step to search for an arrangement order of the discriminator group that minimizes the representative value of the evaluated discriminator counts.

15. The method of claim 13, wherein:
the discriminator exchange step is a step wherein any two discriminators in the discriminator group constituted by a plurality of discriminators arranged in a predetermined order are exchanged; and
the search step is a step wherein the evaluated discriminator count obtaining step and rearrangement step are repeated with respect to each combination of any two discriminators exchanged in the discriminator exchange step to search for an arrangement order of the discriminator group that minimizes the representative value of the evaluated discriminator counts.

16. The method of claim 12, wherein the sample data include unlabeled learning data.

17. The method of claim 13, wherein the sample data are data that include unlabeled learning data.

18. The method of claim 12, wherein:
the discriminator group is a group selected through learning using learning data that follow a predetermined distribution P1; and
the sample data include learning data with a distribution P2 different from the distribution P1.

19. The method of claim 13, wherein:
the discriminator group is a group selected through learning using learning data that follow a predetermined distribution P1; and
the sample data include learning data with a distribution P2 different from the distribution P1.

20. The method of claim 18, wherein the distribution P2 is a distribution close to that of the target data.

21. The method of claim 19, wherein the distribution P2 is a distribution close to that of the target data.

22. A non-transitory computer readable recording medium on which is recorded a program of rapid discrimination apparatus for obtaining a result of discrimination as to whether or not a predetermined object is included in target data of discrimination, the program causing a computer to function as:

a target data input accepting unit that accepts input of the target data "x";

a discriminator group constituted by a plurality of discriminators $f_j$ (j=1 to J) arranged in a predetermined order and used for evaluating whether or not the object is included in the target data "x";

an evaluation value obtaining unit that obtains an evaluation value $f_j(x)$ of the target data "x" evaluated using each of the plurality of discriminators successively from a first discriminator and sequentially obtains an overall evaluation value $F_i(x)$ derived from evaluation values $f_j(x)$ (j=1 to i) of first to $i^{th}$ discriminators from i=1 to J; and a discrimination result determination unit that instructs the evaluation value obtaining unit to terminate the evaluation of I+1$^{th}$ and subsequent discriminators if it is determined, based on a range of evaluation values that each of the I+1$^{th}$ and subsequent discriminators can possibly take, that a discrimination result represented by an overall evaluation value $F_J(x)$ obtained by evaluating the first to i=I$^{th}$ discriminators (I<J) by the evaluation value obtaining unit remains unchanged even if evaluation values of the i+1$^{th}$ and subsequent discriminators are added to the overall evaluation value $F_I(x)$ obtained by evaluating the first to I$^{th}$ discriminators, and determines the discrimination result according to the overall evaluation value $F_I(x)$ obtained by evaluating the first to I$^{th}$ discriminators as a final result.

* * * * *